United States Patent
Hisanaga et al.

(10) Patent No.: US 9,890,681 B2
(45) Date of Patent: Feb. 13, 2018

(54) HEAT EXCHANGE DEVICE WITH THERMOACTUATOR

(71) Applicant: YUTAKA GIKEN CO., LTD., Hamamatsu-shi, Shizuoka (JP)

(72) Inventors: Toru Hisanaga, Hamamatsu (JP); Tomoyuki Uchida, Hamamatsu (JP); Teruaki Hyodo, Hamamatsu (JP)

(73) Assignee: YUTAKA GIKEN CO., LTD. (JP)

( * ) Notice: Subject to any disclaimer, the term of this patent is extended or adjusted under 35 U.S.C. 154(b) by 652 days.

(21) Appl. No.: 14/339,720

(22) Filed: Jul. 24, 2014

(65) Prior Publication Data

US 2015/0027683 A1    Jan. 29, 2015

(30) Foreign Application Priority Data

Jul. 25, 2013  (JP) .................................. 2013-154750
Jul. 25, 2013  (JP) ................................. 2013-154786

(51) Int. Cl.
*G05D 23/00* (2006.01)
*F28F 27/00* (2006.01)
*F01N 5/02* (2006.01)
*G05D 23/02* (2006.01)

(52) U.S. Cl.
CPC .............. *F01N 5/02* (2013.01); *G05D 23/023* (2013.01); *F01N 2410/02* (2013.01); *Y02T 10/16* (2013.01)

(58) Field of Classification Search
CPC ..... F01N 5/02; F01N 2410/02; G05D 23/023; Y02T 10/16
USPC ....................................................... 165/297
See application file for complete search history.

(56) References Cited

U.S. PATENT DOCUMENTS

| | | | | |
|---|---|---|---|---|
| 6,004,127 A | * | 12/1999 | Heimberg | F23K 5/04 251/129.05 |
| 6,024,547 A | * | 2/2000 | Nagae | F04C 28/02 417/62 |
| 6,044,655 A | * | 4/2000 | Ozaki | F25B 9/008 62/205 |
| 6,125,885 A | * | 10/2000 | Hirata | F16K 11/0743 137/625.43 |

(Continued)

FOREIGN PATENT DOCUMENTS

| | | | | |
|---|---|---|---|---|
| CA | 2857775 A1 | * | 1/2015 | F01N 5/02 |
| JP | 2283980 | | 11/1990 | |

(Continued)

OTHER PUBLICATIONS

Notification of Reasons for Refusal dated Jan. 25, 2017, issued in Japanese Patent Application No. 2016-087484 together with English-language translation thereof.

(Continued)

*Primary Examiner* — Ljiljana Ciric
(74) *Attorney, Agent, or Firm* — Klintworth & Rozenblat IP LLP; Bruce L. Adams

(57) ABSTRACT

A heat exchange device includes a thermoactuator that controls a valve to open and close one or the other of two fluid passageways. The thermoactuator includes a temperature-sensitive portion arranged to slidably advance a rod that actuates the valve as the temperature sensed by the temperature-sensitive portion increases. A stopper is positioned to abut the rod to limit advancement of the rod to thereby limit the degree of opening of the valve.

13 Claims, 14 Drawing Sheets

(56) References Cited

U.S. PATENT DOCUMENTS

| | | | | |
|---|---|---|---|---|
| 6,796,375 | B2* | 9/2004 | Williges | F01P 7/167 |
| | | | | 123/41.09 |
| 9,683,761 | B2* | 6/2017 | Itou | F25B 30/02 |
| 2002/0048517 | A1* | 4/2002 | Sugita | B23Q 1/70 |
| | | | | 417/12 |
| 2004/0184923 | A1* | 9/2004 | Iwanami | B60H 1/3223 |
| | | | | 417/221 |
| 2008/0029655 | A1* | 2/2008 | Mabuchi | F01N 5/02 |
| | | | | 248/58 |
| 2012/0138827 | A1* | 6/2012 | Kim | F02B 37/186 |
| | | | | 251/129.11 |
| 2013/0082199 | A1* | 4/2013 | Matsumoto | F16K 31/408 |
| | | | | 251/129.07 |
| 2013/0263955 | A1* | 10/2013 | Hirota | F16K 31/04 |
| | | | | 137/636 |
| 2014/0238067 | A1* | 8/2014 | Itou | F25B 41/04 |
| | | | | 62/324.6 |
| 2015/0083240 | A1* | 3/2015 | Abe | F16K 31/423 |
| | | | | 137/487.5 |
| 2015/0083241 | A1* | 3/2015 | Shiota | F16K 31/423 |
| | | | | 137/487.5 |
| 2015/0083257 | A1* | 3/2015 | Shiota | F25B 41/062 |
| | | | | 137/625.48 |
| 2015/0354709 | A1* | 12/2015 | Okami | F01N 5/02 |
| | | | | 251/298 |
| 2016/0131403 | A1* | 5/2016 | Andoh | F16K 27/029 |
| | | | | 62/160 |

FOREIGN PATENT DOCUMENTS

| | | |
|---|---|---|
| JP | 5032188 | 2/1993 |
| JP | 9042217 | 2/1997 |
| JP | 11117743 | 4/1999 |
| JP | 11210707 | 8/1999 |
| JP | 2001263055 | 9/2001 |
| JP | 2007327628 | 12/2007 |
| JP | 2008144611 | 6/2008 |
| JP | 2009103116 | 5/2009 |
| JP | 2009209913 | 9/2009 |
| JP | 2010071454 | 4/2010 |
| JP | 2010276107 | 12/2010 |
| JP | 2012184678 | 9/2012 |
| JP | 2012189059 | 10/2012 |

OTHER PUBLICATIONS

Notification of Reasons for Refusal together with English-language translation dated Jul. 21, 2015 in Japanese Appln. No. PA2013-154750.
Notification of Reasons for Refusal together with English-language translation dated Jul. 28, 2015 in Japanese Appln. No. PA2013-154786.
Notification of Reasons for Refusal together with English-language translation dated Nov. 27, 2015 in Japanese Appln. No. PA2013-154786.
Notification of Reasons for Refusal together with English-language translation dated Feb. 23, 2016 in Japanese Appln. No. PA2013-154750.
Office Action dated Jul. 3, 2017 in Chinese Application No. 201410356073.4 and English translation thereof.

* cited by examiner

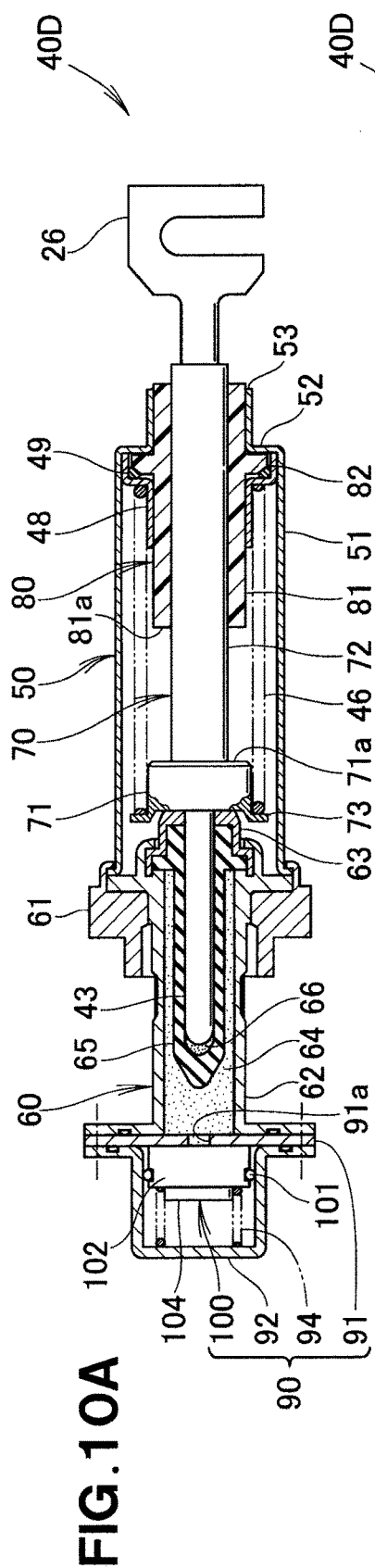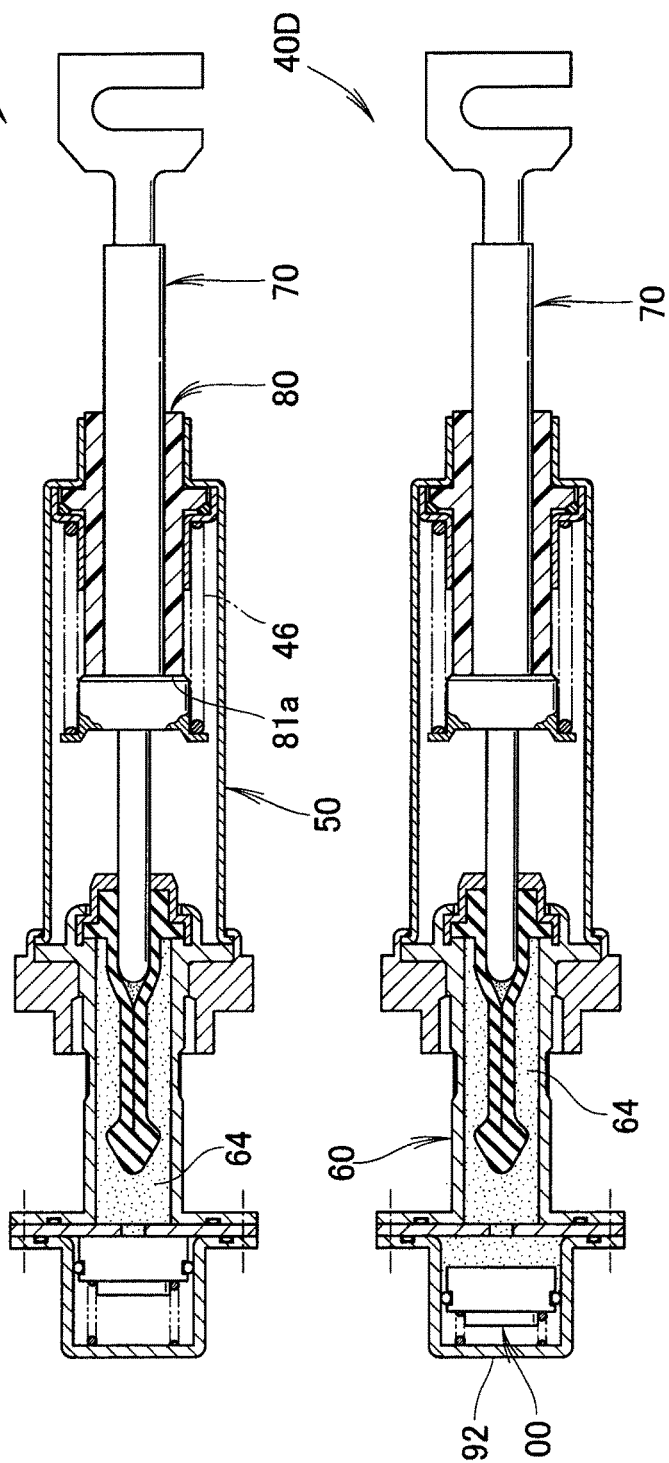

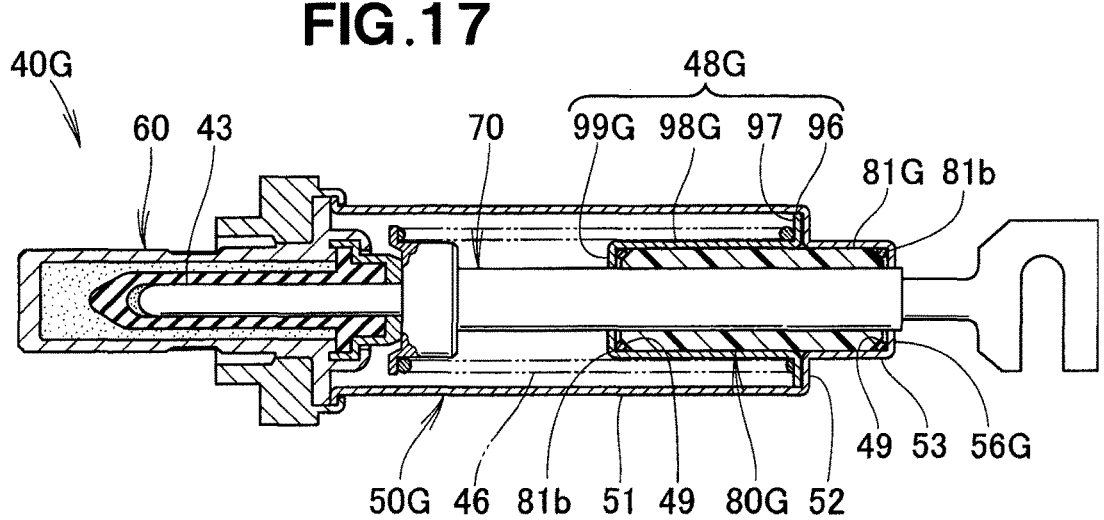
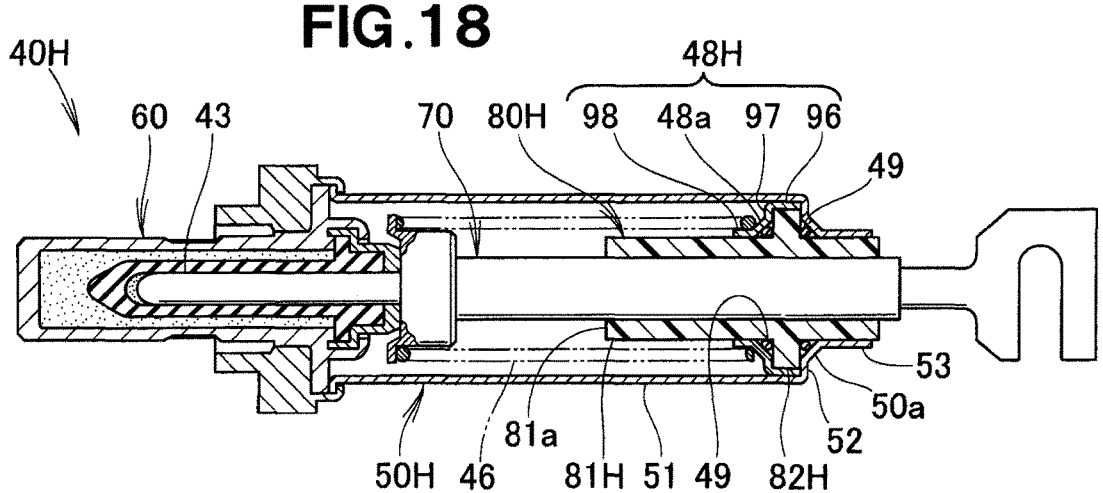
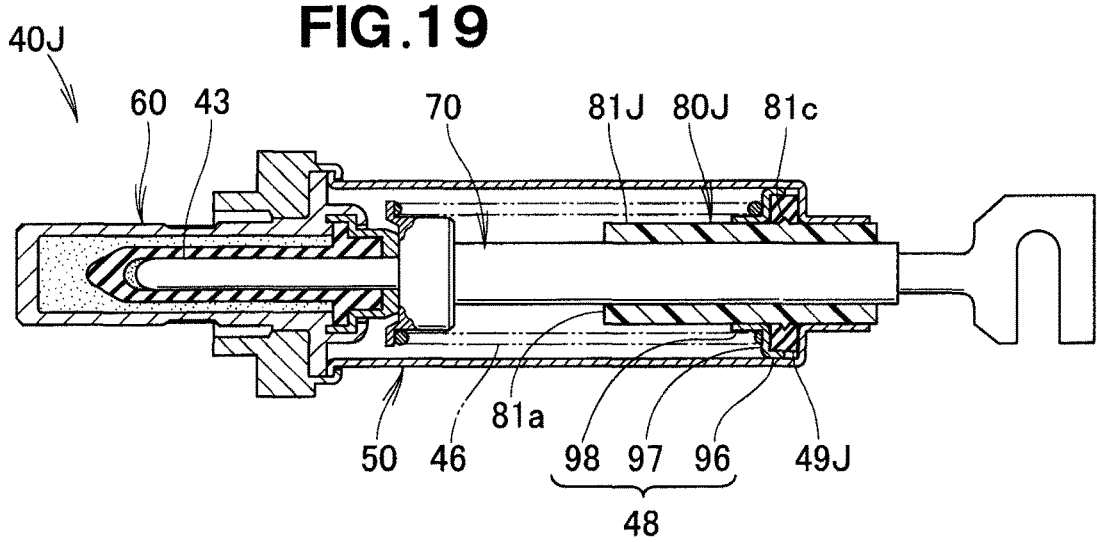

HEAT EXCHANGE DEVICE WITH THERMOACTUATOR

FIELD OF THE INVENTION

The present invention relates to a heat exchange device having a thermoactuator mounted thereon.

BACKGROUND OF THE INVENTION

A thermoactuator is a driving part for advancing or retreating a rod on the basis of a temperature change. Such a thermoactuator is mounted on, e.g., a heat exchange device. The heat exchange device is known as, e.g., a waste heat recovery device. The thermoactuator mounted on the heat exchange device advances the rod when a temperature of a medium is high. The rod is forced to be retreated by an urging force of a return spring incorporated in the thermoactuator when the medium temperature decreases.

The waste heat recovery device has a heat recovery passage for recovery of heat of an exhaust gas, and a bypass passageway bypassing the heat recovery passage. A flow path for an exhaust gas is switched by a valve provided in the waste heat recovery device. To this valve is connected a thermoactuator. The valve is activated by activation of a rod of the thermoactuator. The thermoactuator is connected to a heat exchanger disposed in a heat recovery passage and activated by a temperature of a medium flowing through the heat exchanger.

The thermoactuator used in the manner discussed above is known from, for example, JP-A-2010-71454. The thermoactuator disclosed in JP-A-2010-71454 is shown in FIG. 20 hereof.

As shown in FIG. 20, a thermoactuator 200 includes a case 201 and a temperature-sensitive portion 210 attached to one end of the case 201 for sensing a temperature of surroundings of the case 201 (e.g., a medium temperature). The thermoactuator 200 also includes an actuator rod 203 received in a sleeve 212 of the temperature-sensitive portion 210 for advancing depending upon the temperature sensed by the temperature-sensitive portion 210. The thermoactuator 200 further includes a rod 204 disposed at a distal end of the actuator rod 203 for moving together with the rod in a left-rear direction of this figure. The thermoactuator 200 further includes a bearing 205 disposed on an outer circumference of a distal end of the rod 204 for guiding the rod 204, and a return spring 206 for urging the rod 204 in a direction to retreat the rod 204.

In the thermoactuator 200, a metal such as a steel material is used for the case 201. A resin such as polyimide is used for the bearing 205.

A wax 211 is accommodated in the temperature sensitive portion 210. When a temperature of the wax increases due to a high temperature of the surroundings of the temperature sensitive portion 210, the wax 211 expands. The expansion of the wax 211 forces the sleeve 212 to be compressed to advance the actuator rod 203.

When the temperature of the wax 211 decreases due to a low temperature of the surroundings of the temperature sensitive portion 210, the wax 211 shrinks. In this case, the rod 204 and the actuator rod 203 are forced to retreat under a force of the return spring 206.

The rod 204 is guided by the bearing 205 to move back and forth. As the rod 24 advances and retreats, the bearing 205 slightly wears away. The same goes for the sleeve 212 which the actuator rod 203 contacts. When an amount by which the bearing 205 or the sleeve 212 wears away reaches a predetermined amount, it is necessary to replace the bearing 205 or the sleeve 212.

It is necessary to reduce frequency of replacement of the bearing 205 or the sleeve 212 for use of the thermoactuator over a long period of time.

SUMMARY OF THE INVENTION

In view of the foregoing prior art problems, it is an object of the present invention to provide a heat exchange device having a thermoactuator usable over a long period of time.

According to one aspect of the present invention, there is provided a heat exchange device comprising: a branching portion for introducing an exhaust gas thereinto and dividing the introduced exhaust gas to flow to two fluid passageways; a first fluid passageway extending from the branching portion; a second fluid passageway extending from the branching portion along the first fluid passageway; a heat exchanger attached to the second fluid passageway for recovery of energy from heat of the exhaust gas; a thermoactuator comprising a tubular case, a temperature sensitive portion attached to one end of the case for sensing a temperature of a medium, a piston received in a sleeve in the temperature sensitive portion for advancing by the temperature sensed by the temperature sensitive portion, a rod disposed on a distal end of the piston for advancing by the advancement of the piston, and a return spring accommodated in the case and urging the rod in a direction to retreat the rod; a valve actuated by the thermoactuator for opening and closing the first fluid passageway or the second fluid passageway; and a stopper formed in the case and providing an advancement limit of the rod to limit an opening degree of the valve.

In the present invention, the stopper providing the advancement limit of the rod is formed within the case. When the rod advances to a predetermined position, the rod abuts on the stopper. The abutment prevents further advancement of the rod. Thus, it is possible to prevent the rod from advancing more than necessary. This prevents unnecessary movement of the rod. It becomes possible to inhibit a bearing from wearing due to the rod contacting the bearing. Further, it becomes possible to prevent unnecessary movement of the piston configured to move together with the rod. This makes it possible to inhibit the sleeve from wearing due to the piston contacting the sleeve. The inhibition of the wear reduces frequency of replacement of components of the thermoactuator, thereby enabling use of the thermoactuator over a long period of time.

Where the thermoactuator does not have the stopper, the rod can advance in excess of a predetermined amount, in which case the valve can be activated by the thermoactuator to operate in excess of a predetermined amount. Thus, a valve chamber accommodating the valve is required to have a larger size taking the excess movement of the rod into account. In the thermoactuator of the present invention, the excess movement is prevented by the stopper. Thus, it is not necessary to set a large size of the valve chamber, thereby reducing a size of the heat exchange device.

According to another aspect of the present invention, there is provided A heat exchange device comprising: a branching portion for introducing an exhaust gas thereinto and dividing the introduced exhaust gas to flow to two fluid passageways; a first fluid passageway extending from the branching portion; a second fluid passageway extending from the branching portion along the first fluid passageway; a heat exchanger attached to the second fluid passageway for recovery of energy from heat of the exhaust gas; a thermoactuator comprising a tubular case, a temperature sensitive portion attached to one end of the case for sensing a temperature of a medium, a piston received in a sleeve in the temperature sensitive portion for advancing by the temperature sensed by the temperature sensitive portion, a rod disposed on a distal end of the piston for advancing by the advancement of the piston, and a return spring accommodated in the case and urging the rod in a direction to retreat the rod; a valve actuated by the thermoactuator for opening and closing the first fluid passageway or the second fluid passageway; and a stopper disposed on a center axis of the rod of the thermoactuator, the rod having an advancement limit provided by abutting on the stopper to limit an opening degree of the valve.

In the heat exchange device according to another aspect of the present invention, the stopper is disposed on the center axis of the rod of the thermoactuator. When the rod advances to a predetermined position, the rod abuts on the stopper. The abutment prevents further advancement of the rod. Thus, it is possible to prevent the rod from advancing more than necessary. This prevents unnecessary movement of the rod. It becomes possible to inhibit a bearing from wearing due to the rod contacting the bearing. Further, it becomes possible to prevent unnecessary movement of the piston configured to move together with the rod. This makes it possible to inhibit the sleeve from wearing due to the piston contacting the sleeve. The inhibition of the wear reduces frequency of replacement of components of the thermoactuator, thereby enabling use of the thermoactuator over a long period of time.

Where the thermoactuator does not have the stopper, the rod can advance in excess of a predetermined amount, in which case the valve can be activated by the thermoactuator to operate in excess of a predetermined amount. Thus, a valve chamber accommodating the valve is required to have a larger size taking the excess movement of the rod into account. In the thermoactuator of the present invention, the excess movement is prevented by the stopper. Thus, it is not necessary to set a large size of the valve chamber, thereby reducing a size of the heat exchange device.

According to another aspect of the present invention, there is provided a heat exchange device comprising: a branching portion for introducing an exhaust gas thereinto and dividing the introduced exhaust gas to flow to two fluid passageways; a first fluid passageway extending from the branching portion; a second fluid passageway extending from the branching portion along the first fluid passageway; a heat exchanger attached to the second fluid passageway for recovery of energy from heat of the exhaust gas; a thermoactuator comprising a tubular case, a temperature sensitive portion attached to one end of the case for sensing a temperature of a medium, a piston received in a sleeve in the temperature sensitive portion for advancing by the temperature sensed by the temperature sensitive portion, a rod disposed on a distal end of the piston for advancing by the advancement of the piston, and a return spring accommodated in the case and urging the rod in a direction to retreat the rod; a valve actuated by the thermoactuator for opening and closing the first fluid passageway or the second fluid passageway, the valve being swingable on a valve shaft of the valve; an abutment piece disposed at an end portion of the valve shaft and offset relative to a shaft center of the valve shaft; and a stopper disposed on an orbit of the abutment piece, the rod having an advancement limit provided by abutment of the abutment piece on the stopper to limit an opening degree of the valve.

In the heat exchange device according to another aspect of the present invention, a pin is disposed at the end portion of the valve shaft and offset relative to the shaft center of the valve shaft, and the stopper is disposed on the orbit of the pin. Advancement of the rod rotates the valve shaft to open the valve. When the valve shaft rotates to a predetermined position, the pin disposed at the end portion of the valve shaft abuts on the stopper. The abutment stops swinging of the valve shaft, preventing further advancement of the rod. Thus, it is possible to prevent the rod from advancing more than necessary. This prevents unnecessary movement of the rod. It becomes possible to inhibit a bearing from wearing due to the rod contacting the bearing. Further, it becomes possible to prevent unnecessary movement of the piston configured to move together with the rod. This makes it possible to inhibit the sleeve from wearing due to the piston contacting the sleeve. The inhibition of the wear reduces frequency of replacement of components of the thermoactuator, thereby enabling use of the thermoactuator over a long period of time.

Where no stopper is formed, the rod can advance in excess of a predetermined amount, in which case the valve can be activated by the thermoactuator to operate in excess of a predetermined amount. Thus, where no stopper is formed, a valve chamber accommodating the valve is required to have a larger size taking the excess movement of the rod into account. In the present invention, the excess movement of the rod of the thermoactuator is prevented. Thus, it is not necessary to set a large size of the valve chamber, thereby reducing a size of the heat exchange device.

According to another aspect of the present invention, there is provided a heat exchange device comprising: a branching portion for introducing an exhaust gas thereinto and dividing the introduced exhaust gas to flow to two fluid passageways; a first fluid passageway extending from the branching portion; a second fluid passageway extending from the branching portion along the first fluid passageway; a heat exchanger attached to the second fluid passageway for recovery of energy from heat of the exhaust gas; a valve chamber connected to downstream ends of the first and second fluid passageways, the first and second fluid passageways meeting together at the valve chamber; a thermoactuator comprising a tubular case, a temperature sensitive portion attached to one end of the case for sensing a temperature of a medium, a piston received in a sleeve in the temperature sensitive portion for advancing by the temperature sensed by the temperature sensitive portion, a rod disposed on a distal end of the piston for advancing by the advancement of the piston, and a return spring accommodated in the case and urging the rod in a direction to retreat the rod; a valve accommodated in the valve chamber and actuated by the thermoactuator for opening and closing the first fluid passageway or the second fluid passageway, the valve being swingable on a valve shaft of the valve; and a stopper attached to the valve, the stopper being configured to abut on an inner wall of the valve chamber by a predetermined amount of swinging of the valve, and the rod having an advancement limit provided by the abutment of the stopper on the inner wall of the valve chamber to limit an opening degree of the valve.

In the heat exchange device according to another aspect of the present invention, the stopper is attached to the valve. Advancement of the rod rotates the valve shaft to swing the valve. When the valve swings to a predetermined position, the stopper abuts on the inner wall of the valve chamber. The abutment stops swinging of the valve, preventing further advancement of the rod. Thus, it is possible to prevent the rod from advancing more than necessary. This prevents unnecessary movement of the rod. It becomes possible to inhibit a bearing from wearing due to the rod contacting the bearing. Further, it becomes possible to prevent unnecessary movement of the piston configured to move together with the rod. This makes it possible to inhibit the sleeve from wearing due to the piston contacting the sleeve. The inhibition of the wear reduces frequency of replacement of components of the thermoactuator, thereby enabling use of the thermoactuator over a long period of time.

According to another aspect of the present invention, there is provided a heat exchange device comprising: a branching portion for introducing an exhaust gas thereinto and dividing the introduced exhaust gas to flow to two fluid passageways; a first fluid passageway extending from the branching portion; a second fluid passageway extending from the branching portion along the first fluid passageway; a heat exchanger attached to the second fluid passageway for recovery of energy from heat of the exhaust gas; a valve chamber connected to downstream ends of the first and second fluid passageways, the first and second fluid passageways meeting together at the valve chamber; a thermoactuator comprising a tubular case, a temperature sensitive portion attached to one end of the case for sensing a temperature of a medium, a piston received in a sleeve in the temperature sensitive portion for advancing by the temperature sensed by the temperature sensitive portion, a rod disposed on a distal end of the piston for advancing by the advancement of the piston, and a return spring accommodated in the case and urging the rod in a direction to retreat the rod; a valve accommodated in the valve chamber and actuated by the thermoactuator for opening and closing the first fluid passageway or the second fluid passageway, the valve being swingable on a valve shaft of the valve; and a stopper disposed in the valve chamber and on an orbit of the valve, the rod having an advancement limit provided by abutment of the valve on the stopper to limit an opening degree of the valve.

In the heat exchange device according to another aspect of the present invention, the stopper is attached to the valve chamber. Advancement of the rod rotates the valve shaft to swing the valve. When the valve swings to a predetermined position, the valve abuts on the stopper. The abutment stops swinging of the valve, preventing further advancement of the rod. Thus, it is possible to prevent the rod from advancing more than necessary. This prevents unnecessary movement of the rod. It becomes possible to inhibit a bearing from wearing due to the rod contacting the bearing. Further, it becomes possible to prevent unnecessary movement of the piston configured to move together with the rod. This makes it possible to inhibit the sleeve from wearing due to the piston contacting the sleeve. The inhibition of the wear reduces frequency of replacement of components of the thermoactuator, thereby enabling use of the thermoactuator over a long period of time.

Preferably, the rod comprises a rod base portion abutting on the distal end of the piston, and a rod body portion formed integrally with the rod base portion, the rod base portion has a diameter larger than a diameter of the rod body portion such that the rod base portion has a stepped portion extending toward the rod body portion, the heat exchange device further comprises a bearing disposed along an outer circumferential surface of the rod body portion, the bearing and the stepped portion circumferentially overlapping, and the stopper is formed by an end of the bearing. When the rod advances to bring the stepped portion into contact with the end of the bearing, further advancement of the rod is prevented. Since the end of the bearing is used as the stopper for the rod, it is possible to provide the advancement limit without increasing the number of the components.

Preferably, the rod has a rod flange portion projecting from a lateral surface thereof to an outer circumference of the return spring, the case has a projecting portion projecting from an inner circumferential surface thereof toward a center axis of the case, the projecting portion projects to a location circumferentially overlapping the rod flange portion, and the stopper is formed by the projecting portion. When the rod advances to bring the rod flange portion into contact with the projecting portion, further advancement of the rod is prevented. Since the projecting portion is formed along the inner circumferential surface of the case, the projecting portion has a larger circumferential cross-sectional area than the other portions of the case. The larger circumferential cross-sectional area ensures a large area to contact the rod flange portion. Due to the projecting portion having the large area contacting the rod flange portion, a load applied per unit area of the projecting portion is reduced to achieve a prolonged life of the thermoactuator.

Preferably, the rod comprises a rod base portion abutting on the distal end of the piston, and a rod body portion formed integrally with the rod base portion, the rod base portion has a diameter larger than a diameter of the rod body portion such that the rod base portion has a stepped portion extending toward the rod body portion, the heat exchange device further comprises a guide member extends from an opposite end of the case toward the one end of the case along an inner circumference of the return spring for limiting circumference displacement of the return spring, the guide member and the stepped portion circumferentially overlap, and the stopper is formed by an end of the guide member. When the rod advances to bring the stepped portion into contact with the end of the guide member, further advancement of the rod is prevented. Since the end of the guide member is used as the stopper for the rod, it is possible to provide the advancement limit without increasing the number of the components.

Preferably, the case has an opposite end defining a bend portion folded over to a location circumferentially overlapping the rod, and the stopper is formed by the bend portion. When the rod advances to bring the distal end of the rod into contact with the bend portion, further advancement of the rod is prevented. Since the end of the case is used as the stopper for the rod, it is possible to provide the advancement limit without increasing the number of the components.

Preferably, the thermoactuator further comprises a bearing extending from an opposite end of the case toward the one end of the case along an outer circumferential surface of the rod, and a guide member disposed along an outer circumference of the bearing and receives the return spring for limiting circumferential displacement of the return spring. The bearing is made of a resin material, the case is made of a metal material, the guide member comprises a case contact portion contacting an inner circumferential surface of the case, a receiving portion extending from the case contact portion toward a center axis of the rod and receiving the return spring, and a guide portion extending from a distal end of the receiving portion toward the temperature sensitive portion for limiting circumferential displacement of the return spring, and the heat exchange device further comprises a ring-shaped rubber member disposed between the bearing and the guide member and having an urging force to limit displacement of the bearing. That is, a portion of a gap between the bearing and the case is filled with the rubber member through the guide member. Filling the gap between the bearing and the case prevents the bearing from shaking under a low temperature. On the other hand, the resin-made bearing expands more than the metal case under a high temperature. In this case, the rubber member elastically deforms under the expanding force of the bearing. As a result, a load applied to the case can be made smaller than if the bearing makes close contact under a low temperature.

Preferably, one of the bearing and the guide member has a tapering portion slanting relative to a center axis of the case, and the tapering portion and the rubber member are in contact with each other. Since the tapering portion slants relative to the center axis of the case, an urging force of the rubber member acts in a direction inclined relative to the center axis of the case. That is, the urging force of the rubber member acts in both a direction along the center axis of the case and a circumferential direction of the case. Thus, the gap between the bearing and the case is filled in the axial and circumferential directions, thereby reliably preventing the shaking of the bearing.

Preferably, the thermoactuator further comprises a bearing extending from an opposite end of the case toward the one end of the case along an outer circumferential surface of the rod. The bearing is made of a resin material, the case is made of a metal material, and the heat exchange device further comprises a ring-shaped rubber member disposed between the bearing and the case and having an urging force to limit displacement of the bearing. Filling a portion of a gap between the bearing and the case with the rubber member prevents the bearing from shaking under a low temperature. On the other hand, the resin-made bearing expands more than the metal case under a high temperature. In this case, the rubber member elastically deforms under the expanding force of the bearing. As a result, a load applied to the case can be made smaller than if the bearing makes close contact under a low temperature.

Preferably, one of the bearing and the case has a tapering portion slanting relative to a center axis of the case, and the tapering portion and the rubber member are in contact with each other. Since the tapering portion slants relative to the center axis of the case, an urging force of the rubber member acts in a direction inclined relative to the center axis of the case. That is, the urging force of the rubber member acts in both a direction along the center axis of the case and a circumferential direction of the case. Thus, the gap between the bearing and the case is filled in the axial and circumferential directions, thereby reliably preventing the shaking of the bearing.

Preferably, the rubber member is an O-ring. The O-ring is cheap. That is, measures against the shaking of the bearing can be taken cheaply.

BRIEF DESCRIPTION OF THE DRAWINGS

Preferred embodiments of the present invention will be described in detail below, by way of example only, with reference to the accompanying drawings, in which:

FIGS. 10A to 10C are cross-sectional views of a thermoactuator mounted on a heat exchange device in a fifth embodiment of the present invention;

FIG. 17 is a cross-sectional view of a thermoactuator mounted on a heat exchange device in a twelfth embodiment of the present invention;

FIG. 18 is a cross-sectional view of a thermoactuator mounted on a heat exchange device in a thirteenth embodiment of the present invention;

FIG. 19 is a cross-sectional view of a thermoactuator mounted on a heat exchange device in a fourteenth embodiment of the present invention.

DETAILED DESCRIPTION OF THE PREFERRED EMBODIMENTS

Figure 1:
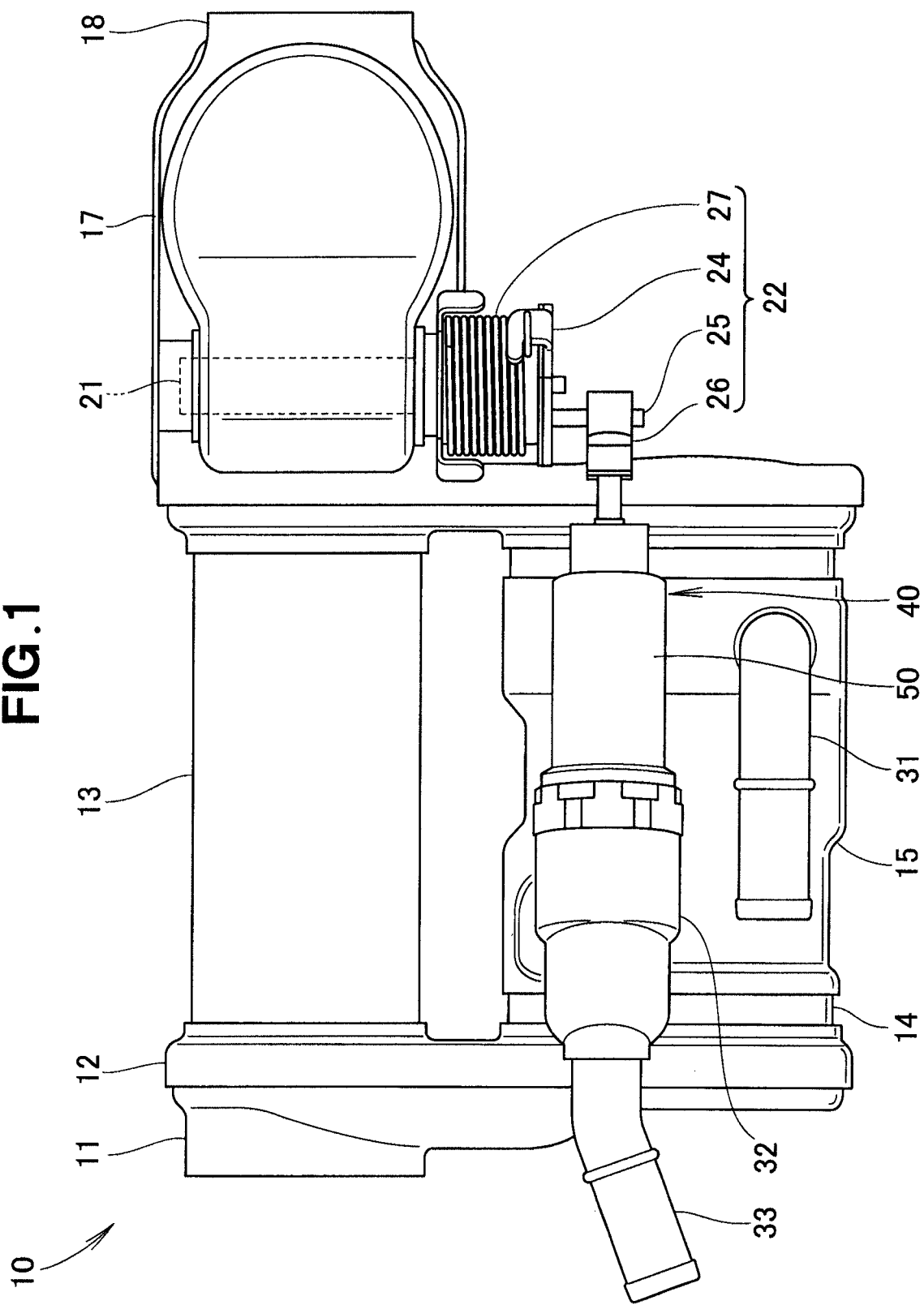
FIG. 1 is a plan view of a heat exchange device in a first embodiment of the present invention.

FIG. 1 shows a heat exchange device in a first embodiment of the present invention. The heat exchange device is, for example, a waste heat recovery device.

As shown in FIG. 1, a waste heat recovery device (heat exchange device) 10 includes an introduction port 11 for introducing an exhaust gas (first heat medium) generated in an internal combustion engine, and a branching portion 12 connected to the introduction port 11. The device 10 also includes a first fluid passageway 13 connected to the branching portion and extending downstream of the introduction port 11, and a second fluid passageway 14 extending from the branching portion 12 along the first fluid passageway 13. The device 10 further includes a heat exchanger 15 forming one part of the second fluid passageway 14 for transferring heat of an exhaust gas to a (second) medium, and a thermoactuator 40 connected to the heat exchanger 15. The device 10 further includes a valve chamber 17 connected to respective downstream ends of the first and second fluid passageways 13, 14, and a discharge port 18 connected to the valve chamber 17 for discharging the exhaust gas. The valve chamber 17 provides a junction to receive an exhaust gas having passed through either of the first and second fluid passageways 13, 14.

Figure 4A:
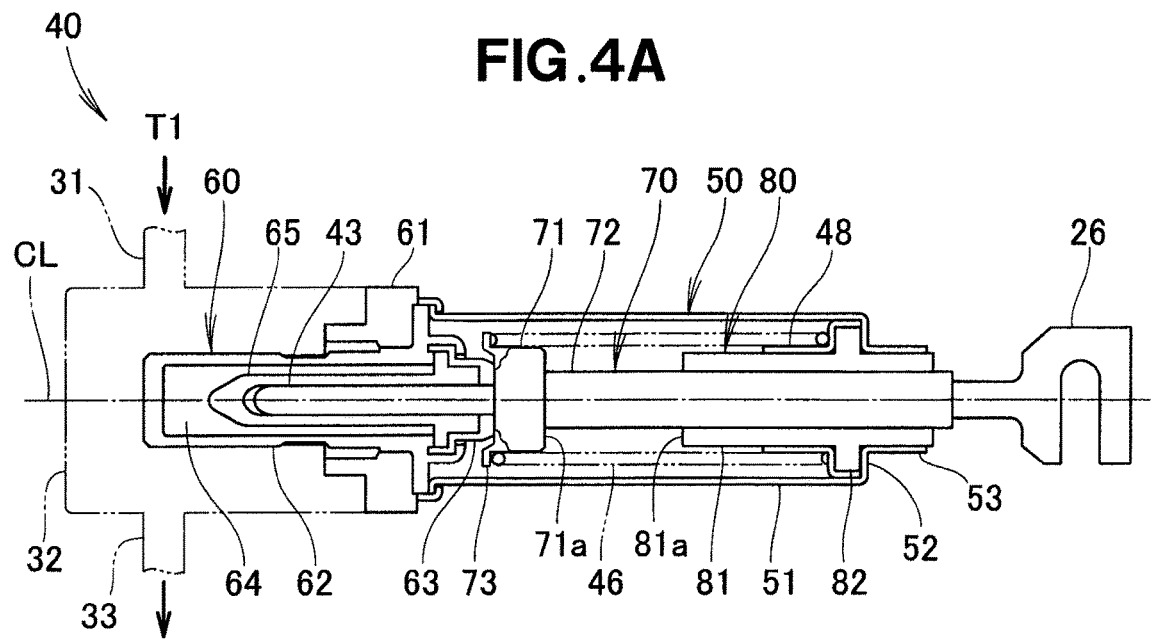
FIGS. 4A and 4B are views showing operation of the heat exchange device shown in FIG. 1
Figure 4B:
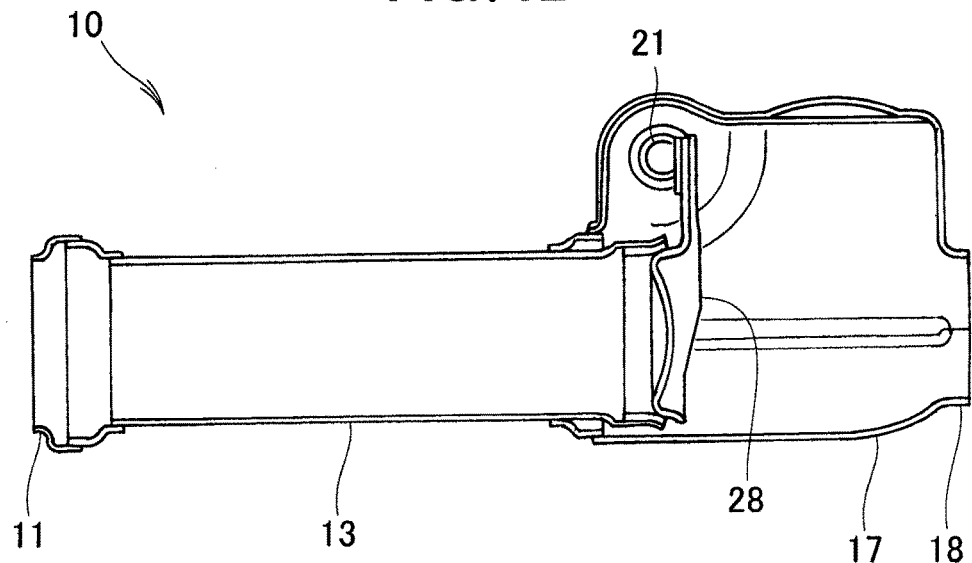

The valve chamber 17 houses a valve 28 (FIG. 4B). The valve is provided to pivot on a valve shaft 21. The thermoactuator 40 is connected through a link mechanism 22 to the valve shaft 21.

The link mechanism 22 includes a plate 24 integrally attached to the valve shaft 21, a pin 25 extending from the plate 24 along the valve shaft 21, a hook portion 26 engaged with the pin 25 and attached to a distal end of the thermoactuator 40, and a link return spring 27.

The heat exchanger 15 has an upper surface to which are attached a medium introducing pipe 31 for introducing a medium into the heat exchanger 15 and an actuator support member 32 supporting the thermoactuator 40. To the actuator support member 32 is connected a medium discharging pipe 33 for discharging a medium out of the heat exchanger 15.

That is, a medium is introduced from the medium introducing pipe 31. The introduced medium picks up heat of an exhaust gas and is discharged from the medium discharging pipe 33. The thermoactuator 40 is discussed below in detail with reference to FIG. 2.

Figure 2:
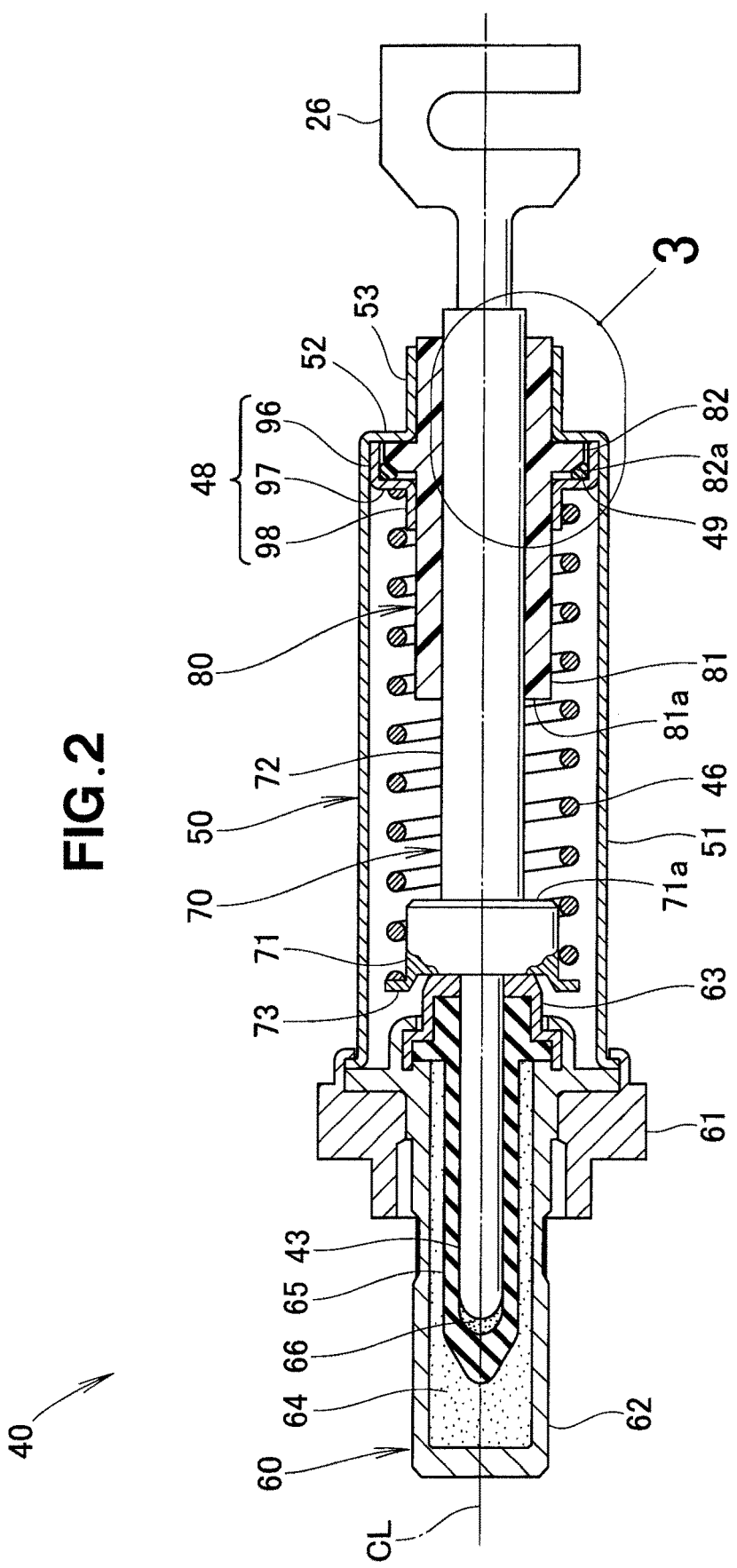
FIG. 2 is a cross-sectional view of a thermoactuator shown in FIG. 1.

As shown in FIG. 2, the thermoactuator 40 includes a metal case 50, and a temperature sensitive portion 60 connected to one end of the case 50 for sensing a temperature of a medium. The thermoactuator 40 also includes a bar-shaped actuator rod (piston) 43 received in the case 50 for advancing depending upon the medium temperature sensed by the temperature sensitive portion 60. The thermoactuator 40 further includes a rod 70 provided on a distal end of the actuator rod 43 for moving together with the actuator rod 43 in a left-right direction of FIG. 2. The thermoactuator 40 further includes a resin-made bearing 80 provided on an outer circumference of a distal end of the rod 70 for guiding the rod 70, and a return spring 46 urging the rod 70 in a direction to retreat the rod 70. The temperature sensitive portion 60 extends into the actuator support member 32 (FIG. 1) for sensing a temperature of a medium flowing in the actuator support member.

The metal for the case 50 may be a steel, a stainless steel, or aluminum etc. The resin for the bearing 80 may be polyimide, poly phenylene sulfide resin, or polytetrafluoroethylene etc.

The case 50 includes a tubular case base portion 51 and a case stepped portion 52 extending from a distal end of the case base portion 51 toward a center axis CL of the rod to decrease in diameter. The case 50 further includes a reduced diameter portion 53 extending from a distal end of the case stepped portion 52 along the bearing 80. The case base portion 51, the case stepped portion 52 and the reduced diameter portion 53 are integral with one another.

The temperature sensitive portion 60 includes a connection flange 61 lockingly engaging the one end of the case 50, an element case 62 coupled to an inside of the connection flange 61, and a cover 63 lockingly engaging a distal end of the element case 62. The temperature sensitive portion 60 also includes a wax 64 filling a space defined by the cover 63 and the element case 64. The temperature sensitive portion 60 further includes a flexible sleeve 65 disposed in the wax 64. The sleeve 65 has an inner space filled with a grease 66.

Where the thermoactuator 40 is used in the waste heat recovery device 10 (FIG. 1), the temperature sensitive portion 60 is inserted into the actuator support member 32 (FIG. 1) to allow a medium to flow around the temperature sensitive portion 60 for sensing a temperature around the temperature sensitive portion 60. More specifically, the temperature sensitive portion 60 senses a temperature of a medium flowing around the temperature sensitive portion 60.

The rod 70 includes a rod base portion 71 abutting on the distal end of the actuator rod 43, and a rod body portion 72 formed integrally with the rod base portion 71 and attached at its distal end to the hook portion 26. The rod 70 further includes a rod flange portion 73 projecting outwardly from the rod base portion 71 and extending circumferentially of the rod base portion 71. The rod flange portion 73 bears against a rear end of the return spring 46.

The rod base portion 71 is larger in diameter than the rod body portion 72 such that the rod base portion 71 has a stepped portion 71a extending to the rod body portion 72.

The bearing 80 includes a tubular portion 81 having an inner circumferential surface which the rod body portion 72 slidably contacts. The bearing 80 also includes a stopper portion 82 projecting outwardly from the tubular portion 81 and extending circumferentially of the tubular portion 81. The stopper portion 82 abuts on the case stepped portion 52. The bearing 80 has a rear end 81a providing a stopper limiting advancement of the rod 70. The stopper portion 82 has a front surface contacting the case stepped portion 52.

A guide member 48 is disposed along an outer circumference of the bearing 80. The guide member 48 limits circumferential displacement of the return spring 46 and bears against a front end of the return spring 46. The guide member 48 has a portion along the stopper portion 82 of the bearing 80. A relationship between the guide member 48 and the stopper portion 82 is discussed in detail with reference to FIG. 3.

Figure 3:
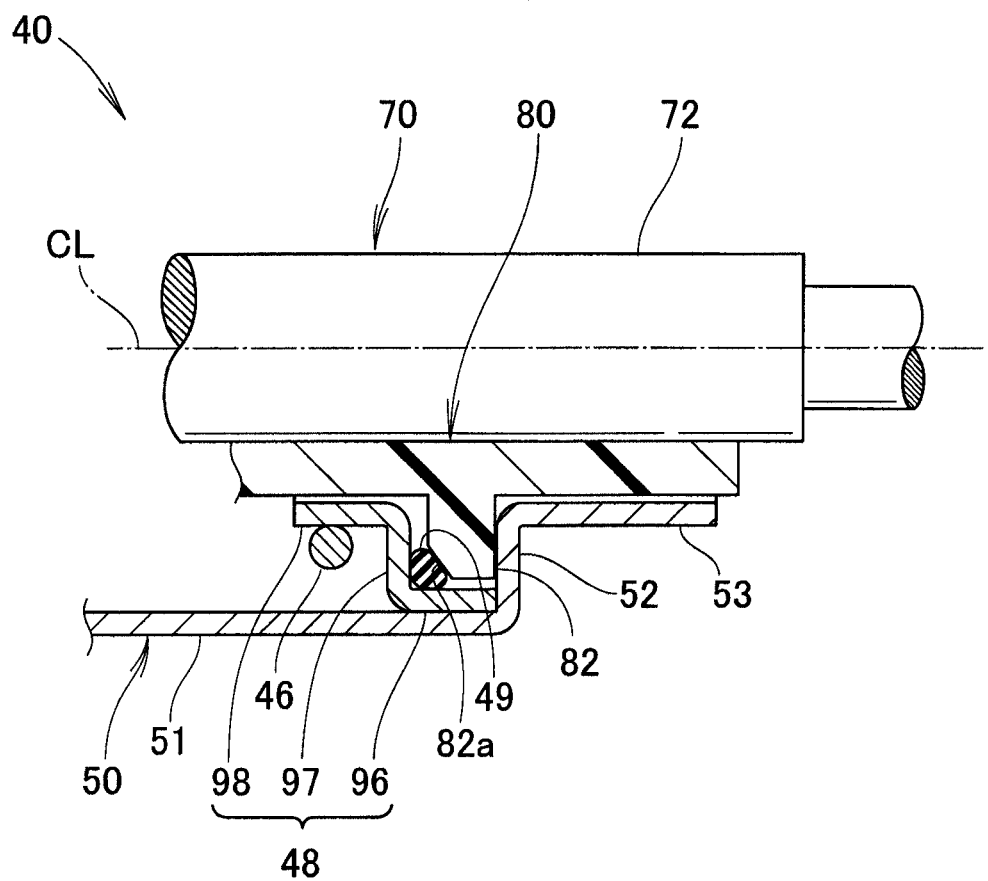
FIG. 3 is an enlarged view of a region 3 of FIG. 2.

As shown in FIG. 3, the stopper portion 82 has at its outer circumference a rear end defining a tapering portion 82a slanting relative to the center axis CL of the rod 70.

The guide member 48 includes a case contact portion 96 contacting and adhering to an inner circumferential surface of the case 50. The guide member 48 also includes a receiving portion 97 extending from the case contact portion 96 toward the center axis CL of the rod 70 and bearing against the return spring 46. The receiving portion 97 has a distal end on a side of the center axis CL. The guide member 48 further includes a guide portion 98 extending rearwardly from this distal end of the receiving portion 97 for limiting the circumferential displacement of the return spring 46.

A rubber-made O-ring 49 (rubber-made member) fits between the guide member 48 and the tapering portion 82a. The bearing 80 has an outer diameter set to be slightly smaller than an inner diameter of the case 50 at a low temperature.

Reference to FIGS. 1 to 3 reveals that the thermoactuator 40 is formed as follows.

The thermoactuator 40 includes the tubular case 50, the temperature sensitive portion 60 attached to the one end of the case for sensing a temperature of the outside, the piston 43 received in the case 50 for advancing depending upon the temperature sensed by the temperature sensitive portion 60, the rod 70 disposed on the distal end of the piston 43 for advancement caused by the advancement of the piston 43, the return spring 46 accommodated in the case 50 for urging the rod in the direction to retreat the rod 70, the bearing 80 extending along an outer circumferential surface of the rod 70 from the opposite end of the case 50 toward the one end of the case 50, and the guide member 48 disposed on the outer circumference of the bearing 80 and bearing against the return spring 46 for limiting the circumferential displacement of the return spring 46. The material for the bearing 80 is resin, and the material for the case is metal. The guide member 48 includes the case contact portion 96 contacting the inner circumferential surface of the case 50, the receiving portion 97 extending from the case contact portion 96 toward the center axis CL of the rod 70 and bearing against the return spring 46, and the guide portion 98 extending from the distal end of the receiving portion 97 toward the temperature sensitive portion 60 for limiting the circumferential displacement of the return spring 46. The O-ring (ring-shaped rubber member) 49 fits between the bearing 80 and the guide member 48 for providing an urging force to limit a displacement of the bearing 80. Operation of the thermoactuator 40 is discussed with reference to other figures than FIGS. 1 to 3 along with operation of the waste heat recovery device 10 (FIG. 1).

As shown in FIG. 4A, a medium flows from the heat exchanger 15 (FIG. 1) to a circumferential edge of the temperature sensitive portion 60. When a temperature T1 of the medium is low, the wax 64 remains shrunk. With the wax 64 shrunk, the rod 70 is held at a retreating limit under an urging force of the return spring 46. That is, the temperature sensitive portion 60 senses a temperature in a vicinity of the temperature sensitive portion 60, allowing the rod 70 to be held at the retreating limit.

As shown in FIG. 4B, where the temperature of the medium is low, the first fluid passageway 13 is closed by the valve 28 attached to the valve shaft 21.

Referring back to FIG. 1, when the first fluid passageway 13 is closed, an exhaust gas introduced from the introduction port 11 flows to the second fluid passageway 14 where the exhaust gas performs thermal exchange with the medium flowing within the heat exchanger 15 to heat the medium.

Figure 5A:
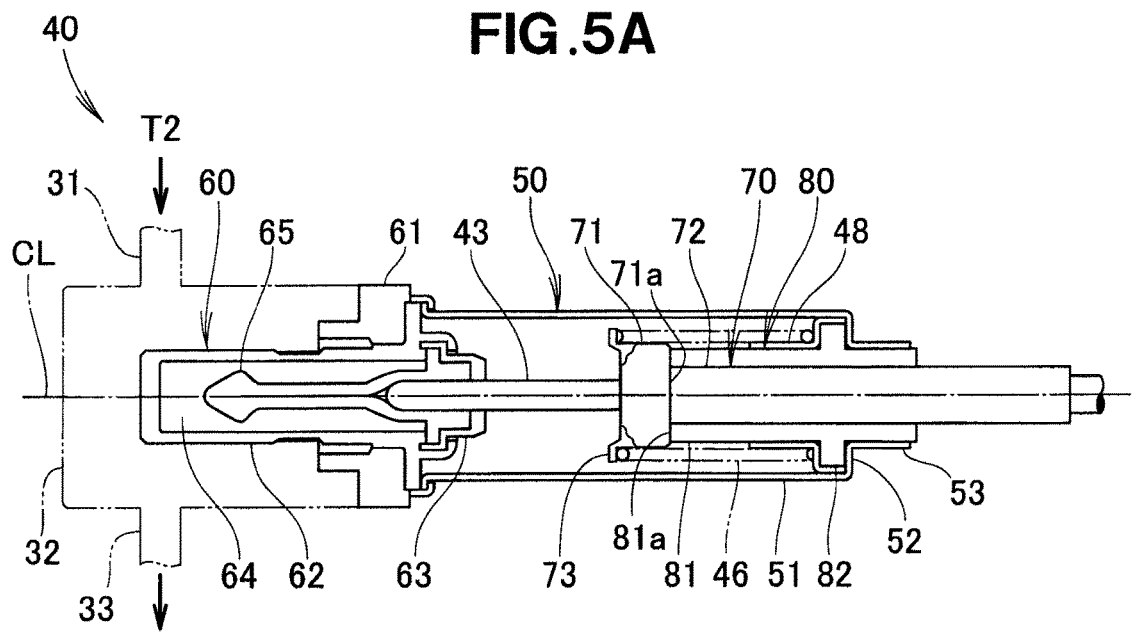
FIGS. 5A and 5B are views showing operation of the heat exchange device when a rod shown in FIG. 2 moves to an advancement limit.

As shown in FIG. 5A, heating the medium expands the wax 64. The expansion of the wax 64 compresses the sleeve 65 to cause the actuator rod 43 to advance against the urging force of the return spring 46. That is, the temperature sensed by the temperature sensitive portion 60 causes the advancement of the actuator rod 43. Together with the actuator rod 43, the rod 70 advances.

When the temperature of the medium reaches a temperature T2, the stepped portion 71a of the rod 70 abuts on the end 81a of the bearing 80. This prevents further advancement of the rod 70.

Figure 5B:
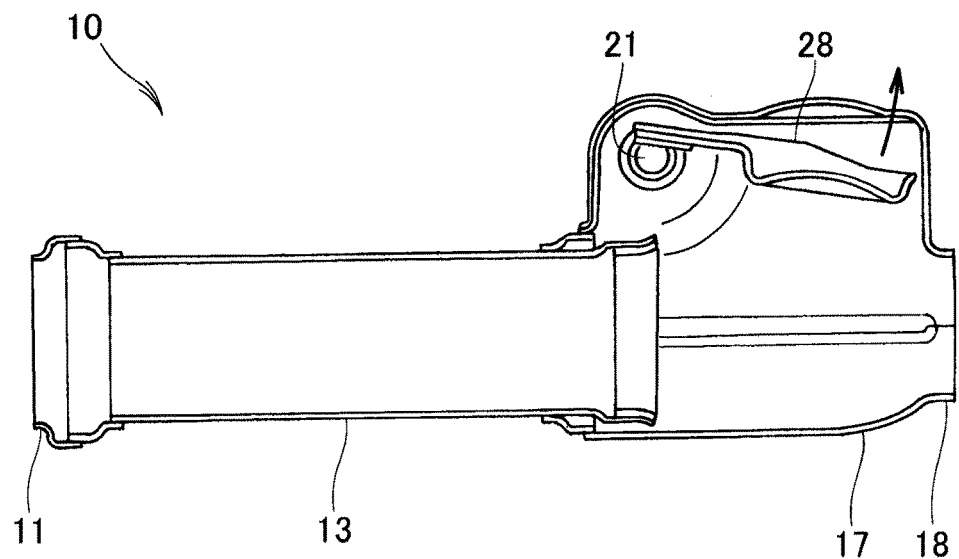

As shown in FIG. 5B, when the temperature of the medium is T2, the valve 28 opens the first fluid passageway 13 in an amount sufficient to allow an exhaust gas to pass through the first fluid passageway 13.

Referring back to FIG. 1, when the first fluid passageway 13 is opened, an exhaust gas flows within the first fluid passageway 13 located downstream of and attached to the introduction port 11 in alignment therewith. In this case, since the exhaust gas does not flow into the second fluid passageway 14, thermal exchange does not occur between the exhaust gas and the medium.

Referring back to FIG. 5A, the stopper (the end 81a of the bearing 80) providing an advancement limit of the rod 70 is formed within the case 50. When the rod 70 advances to a predetermined position, the rod 70 abuts on the end 81a of the bearing 80. The abutment prevents further advancement of the rod 70. Thus, it is possible to prevent the rod 70 from advancing more than necessary. The prevention of the unnecessary movement inhibits the bearing 80 from wearing due to the rod 70 contacting the bearing 80. As discussed above, the actuator rod 43 moves together with the rod 70. By preventing the unnecessary movement of the rod 70, it is possible to inhibit the sleeve 65 from wearing due to the actuator rod (piston) 43 contacting the sleeve 65. The inhibition of the wear reduces frequency of replacement of components of the thermoactuator 40, thereby enabling use of the thermoactuator 40 over a long period of time.

As discussed above, the rod 70 has the stepped portion 71a formed thereon and the stopper is formed by the end 81a of the bearing 80. When the rod 70 advances to bring the stepped portion 71a into contact with the end 81a of the bearing 80, further advancement of the rod 70 is prevented. Since the end 81a of the bearing 80 is used as the stopper for the rod 70, it is possible to provide an advancement limit without increasing the number of the components.

As discussed above, the bearing 80 has the stopper portion 82 extending along the outer circumference, and the front surface of the stopper portion 82 abuts on the case 50 (the case stepped portion 52). When the rod 70 comes into contact with the bearing 80, the stopper portion 82 bears a force applied in a direction from the rear side to the front side. As a result, displacement of the bearing 80 along the center axis CL is prevented to reliably prevent movement of the rod 70.

Referring also to FIG. 5B, an amount of advancement of the rod 70 is set in correspondence to an amount of turning of the valve 28. That is, when the valve 28 turns to a sufficiently open position, advancement of the rod 70 is stopped. As a result, the valve 28 stops turning at a predetermined location. Where the thermoactuator 40 does not have the stopper, the rod 70 can advance in excess of a predetermined amount, in which case the valve 28 can be activated by the thermoactuator 40 to turn in excess of a predetermined amount. Thus, where the thermoactuator 40 does not have the stopper, the valve chamber 17 accommodating the valve 28 is required to have a larger size taking the excess movement of the rod 70 into account. In the thermoactuator 40 discussed above, the excess movement is prevented. Thus, it is not necessary to set a large size of the valve chamber 17, thereby reducing a size of the waste heat recovery device 10. A further discussion as to operation of the thermoactuator is made below.

Figure 20:
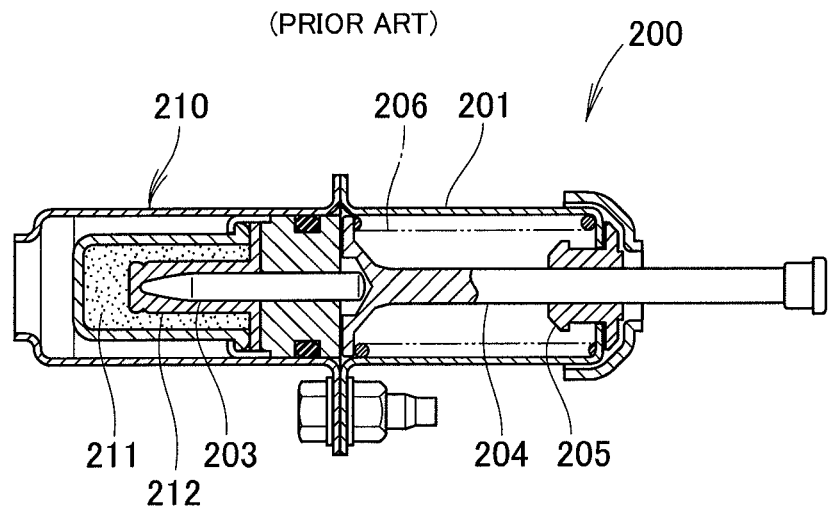
FIG. 20 is a cross-sectional view of a conventional heat exchange device.

Referring to FIG. 20, generally speaking, resin (bearing 205) is larger in coefficient of expansion than metal (case 201). It is believed that a size of the bearing is set to allow for appropriate contact between the bearing and the case under a high temperature, taking account of use of the bearing in a device like a waste heat recovery device which becomes high in temperature. However, a gap can occur between the case 201 and the bearing 205 under a low temperature because the bearing 205 shrinks more than the case 201. As the rod 204 moves through the bearing 205 with such a gap between the case and the bearing, thus, the bearing 205 shakes.

On the other hand, where the size of the bearing 205 is set to allow for appropriate contact between the bearing 205 and the case 201 under a low temperature, the case 201 bears a large load due to the bearing 205 greatly expanding under a high temperature.

It is desirable to provide a technique for preventing the shake of the bearing 205.

Figure 6A:
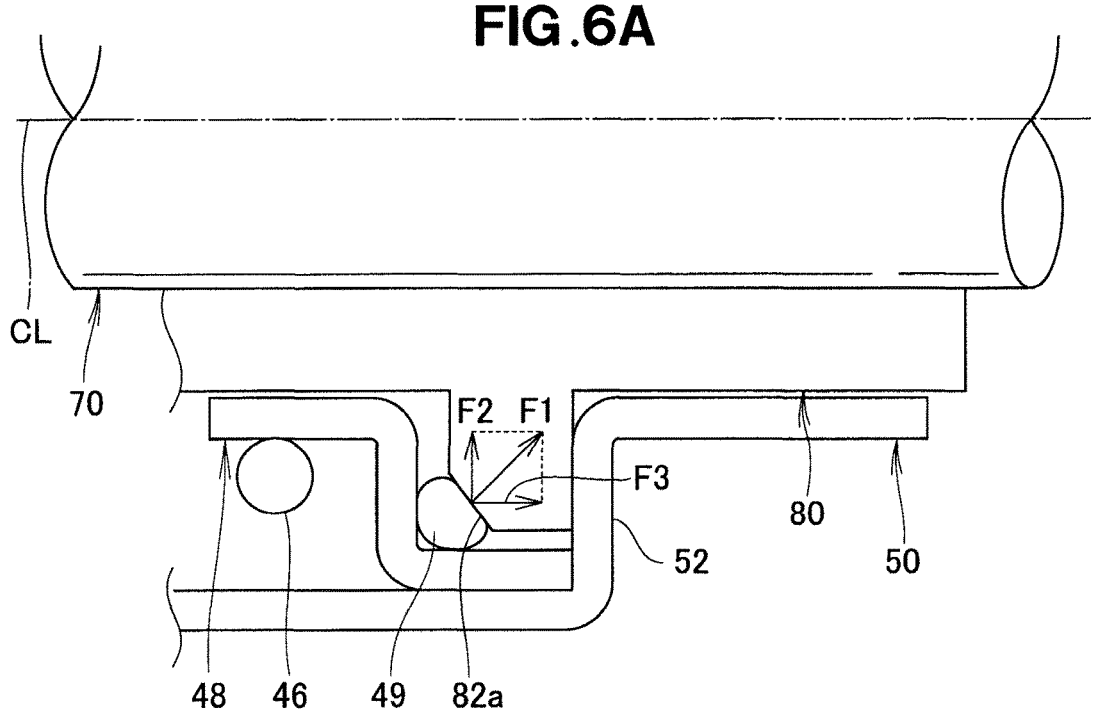
FIGS. 6A and 6b are views showing operation of an O-ring shown in FIG. 3.

As shown in FIG. 6A, slight gaps are formed between the bearing 80 and the case 50 and between the bearing 80 and the guide member 48 under a low temperature. An urging force F1 of the O-ring 49 contacting the tapering portion 82a acts in a direction normal to the tapering portion 82a. Since the tapering portion 82a slants relative to the center axis CL of the rod 70, a component F2 of the urging force F1 acts in a direction toward the center axis CL of the rod 70 and a component F3 of the urging force F1 acts in a direction along the center axis CL of the rod 70.

The component F2 acting in the direction toward the center axis CL of the rod 70 is applied to the tapering portion 82a throughout the entire circumference of the tapering portion 82a. That is, the bearing 80 is urged toward the center axis CL of the rod 70 throughout the entire circumference of the bearing 80.

The component F3 acting in the direction along the center axis CL of the rod 70 is applied to the tapering portion 82a throughout the entire circumference of the tapering portion 82a. That is, the bearing 80 is pressed against the case stepped portion 52 throughout the entire circumference of the bearing 80.

A portion of the gap between the bearing 80 and the case 50 is filled with the O-ring 49 through the guide member 48. Filling the gap between the bearing 80 and the case 50 prevents the bearing from shaking under a low temperature.

Since the urging force F1 of the O-ring 49 acts both in a central axial direction of the case 50 and in a circumferential direction of the case 50, the gap between the bearing 80 and the case 50 is filled in the axial and circumferential directions, thereby reliably preventing the shaking of the bearing 80.

The O-ring 49 is used as the rubber member. The O-ring 49 is cheap. That is, measures against the shaking of the bearing 80 can be taken cheaply.

Figure 6B:
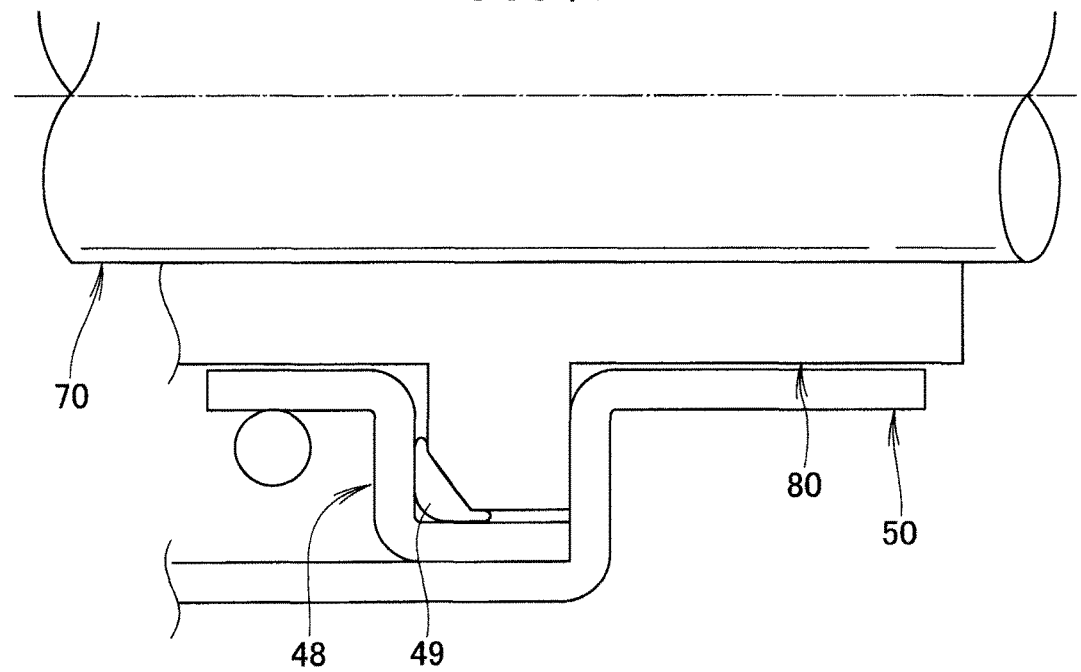

As shown in FIG. 6B, the resin-made bearing 80 of large coefficient of expansion expands more than the metal case 50 under a high temperature. Due to the relatively great expansion of the bearing 80, the bearing 80 comes into contact with the inner circumferential surface of the case 50, in which case the O-ring 49 elastically deforms under the expanding force of the bearing 80. That is, by deforming, the O-ring 49 escapes a gap left between the guide member 49 and the bearing 80. As a result, a load applied to the case 50 can be made smaller than if the bearing 80 closely contacts the case 50 under a low temperature. That is, it is possible to prevent the shaking of the bearing 80 under the low temperature and reduce a load applied to the case 50 under the high temperature.

<Second Embodiment>

Figure 7:
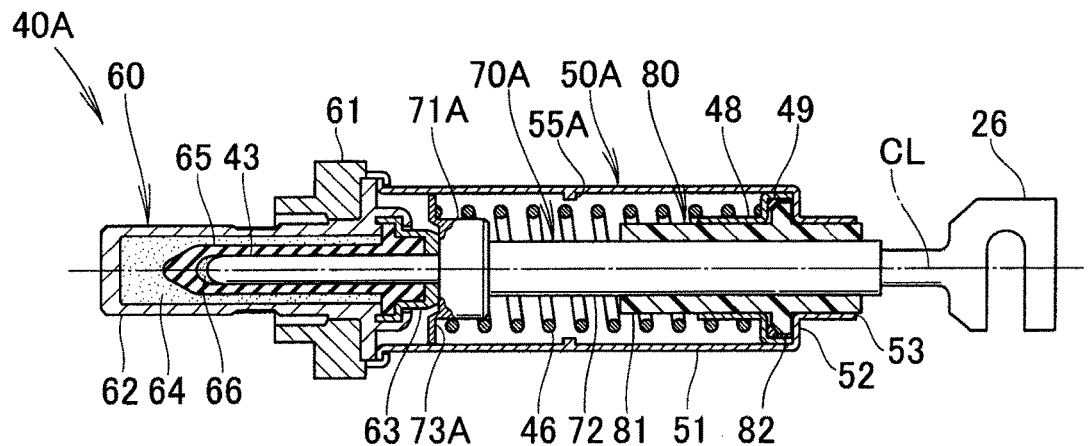
FIG. 7 is a cross-sectional view of a thermoactuator mounted on a heat exchange device in a second embodiment of the present invention.

Next, a second embodiment of the present invention is discussed with reference to FIG. 7. FIG. 7 shows a cross-section of a thermoactuator mounted on a heat exchange device in correspondence to FIG. 2. It is noted that elements common to those in FIG. 2 are designated by the same reference numerals and their detailed discussions are omitted.

As shown in FIG. 2, a thermoactuator 40A differs from the thermoactuator in the first embodiment in that the stopper and the rod flange portion are modified.

More specifically, a rod 70A has a rod flange portion 73A projecting from a lateral surface of a rod base portion 71A thereof to an outer circumference of the return spring 46.

A case 50A has a projecting portion 55A projecting from an inner circumferential surface thereof toward a center axis CL of the case 50A. The projecting portion 55A projects to a location circumferentially overlapping the rod flange portion 73A. That is, the projecting portion 55A projects to a location where the rod flange portion 73A can abut on the projecting portion 55A. This projecting portion 55A forms a stopper. When the rod 70A advances a predetermined amount, the rod flange portion 73A contacts the projecting portion 55A. The projecting portion 55A prevents further advancement of the rod 70A.

The projecting portion 55A may be formed integrally with the case 50A or separate from the case 50A. In the thermoactuator 40A, the unnecessary movement of the rod 70A is prevented to thereby inhibit the bearing 80 from wearing due to the rod 70A contacting the bearing 80. In addition, it is possible to inhibit the sleeve 65 from wearing due to the actuator rod (piston) 43 contacting the sleeve 65.

Since the projecting portion 55A is formed along the inner circumferential surface of the case 50A, the projecting portion 55A has a larger circumferential cross-sectional area than the other portions of the case 50A. The larger circumferential cross-sectional area ensures a large area to contact the rod flange portion 73A. Due to the projecting portion 55A having the large area contacting the rod flange portion 73A, a load applied per unit area of the projecting portion 55A is reduced to achieve a prolonged life of the thermoactuator 40A.

As for the first embodiment, it is required to ensure a minimum necessary length of the bearing. In this respect, a stopper can be formed at a limited location. In contrast, since the projecting portion 55A can be disposed regardless of the length of the bearing, a freedom to dispose the projecting portion 55A in the axial direction is enhanced.

<Third Embodiment>

Figure 8:
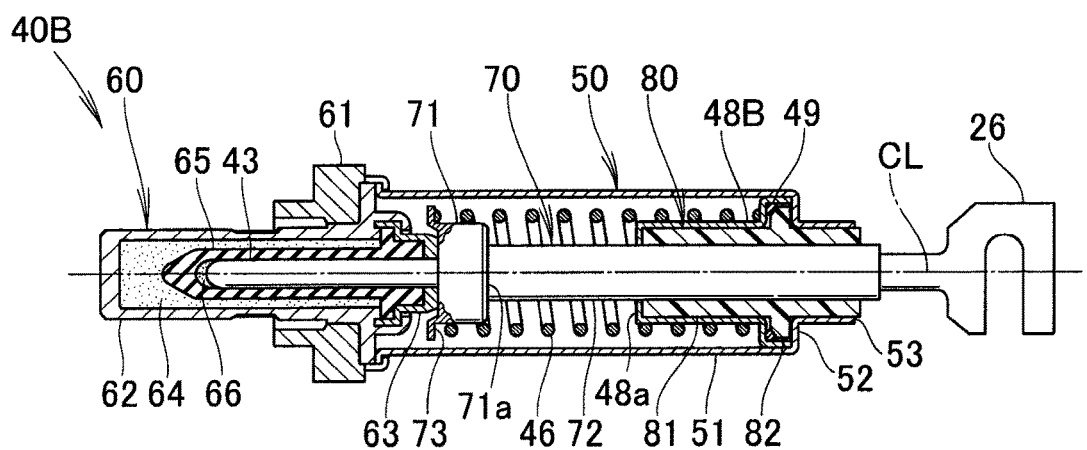
FIG. 8 is a cross-sectional view of a thermoactuator mounted on a heat exchange device in a third embodiment of the present invention.

Next, a third embodiment of the present invention is discussed with reference to FIG. 8. FIG. 8 shows a cross-section of a thermoactuator mounted on a heat exchange device in correspondence to FIG. 2. It is noted that elements common to those in FIG. 2 are designated by the same reference numerals and their detailed discussions are omitted.

As shown in FIG. 8, a thermoactuator 40B differs from the thermoactuator in the first embodiment in that the guide member is modified.

More specifically, a guide member 48B for limiting circumference displacement of the return spring 46 extends from the opposite end of the case 50 toward the one end of the case 50 along an inner circumference of the return spring 46. The guide member 48B and the stepped portion 71a circumferentially overlap. The guide member 48B has a rear end 48a forming a stopper. When the rod 70 advances a predetermined amount, the stepped portion 71a contacts the end (stopper) 48a of the guide member 48B to prevent further advancement of the rod 70.

The rear end 48a of the guide member 48 is desirably bent toward the center axis CL along a rear end of the bearing 80. This is because the stopper portion 82 can bear a force acting in a direction from the front side to the rear side when the rod 70 comes into contact with the end 48a of the guide member 48B. As a result, axial displacement of the bearing 80 and the guide member 48b is prevented to reliably prevent further movement of the rod 70. The bearing 80 has a length reaching the end 48a of the guide member 48B. That is, both the guide member 48B and the bearing 80 extend to substantially the same location forming the stopper.

In the thermoactuator 40B, the unnecessary movement of the rod 70 is prevented to thereby inhibit the bearing 80 from wearing due to the rod 70 contacting the bearing 80. In addition, it is possible to inhibit the sleeve 65 from wearing due to the actuator rod (piston) 43 contacting the sleeve 65.

Since the end 48a of the guide member 48B is used as the stopper for the rod 70, it is possible to provide an advancement limit of the rod 70 without increasing the number of the components.

<Fourth Embodiment>

Figure 9:
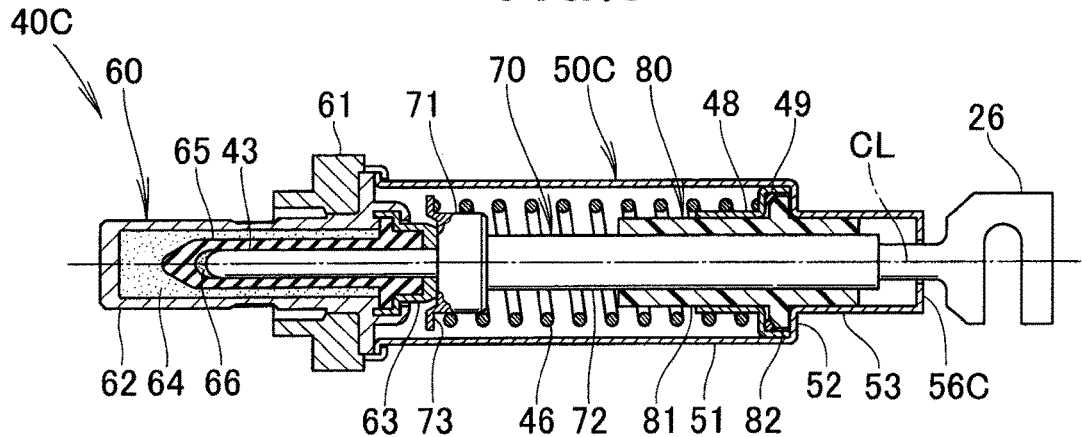
FIG. 9 is a cross-sectional view of a thermoactuator mounted on a heat exchange device in a fourth embodiment of the present invention.

Next, a fourth embodiment of the present invention is discussed with reference to FIG. 9. FIG. 9 shows a cross-section of a thermoactuator mounted on a heat exchange device in correspondence to FIG. 2. It is noted that elements common to those in FIG. 2 are designated by the same reference numerals and their detailed discussions are omitted.

As shown in FIG. 9, a thermoactuator 40C differs from the thermoactuator in the first embodiment in that the shape of the case is modified.

More specifically, a case 50C has one end and an opposite end defining a bend portion 56C folded over to a location circumferentially overlapping the rod 70. This bend portion 56C forms a stopper. Abutment of the distal end of the rod 70 on the bend portion 56C prevents advancement of the rod 70.

In the thermoactuator 40C, the unnecessary movement of the rod 70 is prevented to thereby inhibit the bearing 80 from wearing due to the rod 70 contacting the bearing 80. In addition, it is possible to inhibit the sleeve 65 from wearing due to the actuator rod (piston) 43 contacting the sleeve 65.

Since the end of the case 50C is used as the stopper for the rod 70, it is possible to provide an advancement limit of the rod 70 without increasing the number of the components. Since, the rod 70 is covered by the case 50C along the length to the distal end thereof, the rod 70 can be protected.

<Fifth Embodiment>

Next, a fifth embodiment of the present invention is discussed with reference to FIGS. 10A to 10C. FIGS. 10A to 10C are cross-sections of a thermoactuator mounted on a heat exchange device in correspondence to FIG. 2. It is noted that elements common to those in FIG. 2 are designated by the same reference numerals and their detailed discussions are omitted.

As shown in FIG. 10A, a thermoactuator 40D is the thermoactuator in the first embodiment with a wax escape portion added.

More specifically, an escape portion 90 is attached to the temperature sensitive portion 60 for allowing the wax 64 further expanding to escape into the escape portion 90 with the rod 70 positioned at the advancement limit.

The escape portion 90 includes a plate 91 connected to the temperature sensitive portion 60 (element case 62) and having a hole 91a formed through the plate 91. The escape portion 90 also includes an escape case 92 connected to the plate 91, and a closure member 100 accommodated in the escape case 92 for closing the hole 91a. The escape portion 90 further includes a spring 94 urging the closure member 100 toward the plate 91. In other words, the plate 91 provides a valve seat, and the escape case 92 provides a valve body.

The closure member 100 includes a disc-shaped base portion 102 having an outer circumference to which a seal 101 is attached. The closure member 100 further includes a guide portion 104 formed integrally with the base portion 102 and along an inner circumference of the spring 49.

The spring 94 of the escape portion 90 has a spring constant larger than that of the return spring 46 and the hole 91a has a small diameter, such that the rod 70 shifts prior to the closure member 100.

As shown in FIG. 10B, as a temperature rises to expand the wax 64, the rod 70 starts to advance. After advancing a predetermined amount, the rod 70 is prevented by the end 81a of the bearing 80 from further advancing.

As shown in FIG. 10C, the wax 64 further expands to force the closure member 100 to be depressed. The depression of the closure member 100 allows the wax 64 to escape into the escape portion 92. This results in a load applied to the temperature sensitive portion 60 being reduced.

In the thermoactuator 40D, the unnecessary movement of the rod 70 is prevented to thereby inhibit the bearing 80 from wearing due to the rod 70 contacting the bearing 80. In addition, it is possible to inhibit the sleeve 65 from wearing due to the actuator rod (piston) 43 contacting the sleeve 65.

<Sixth Embodiment>

Figure 11:
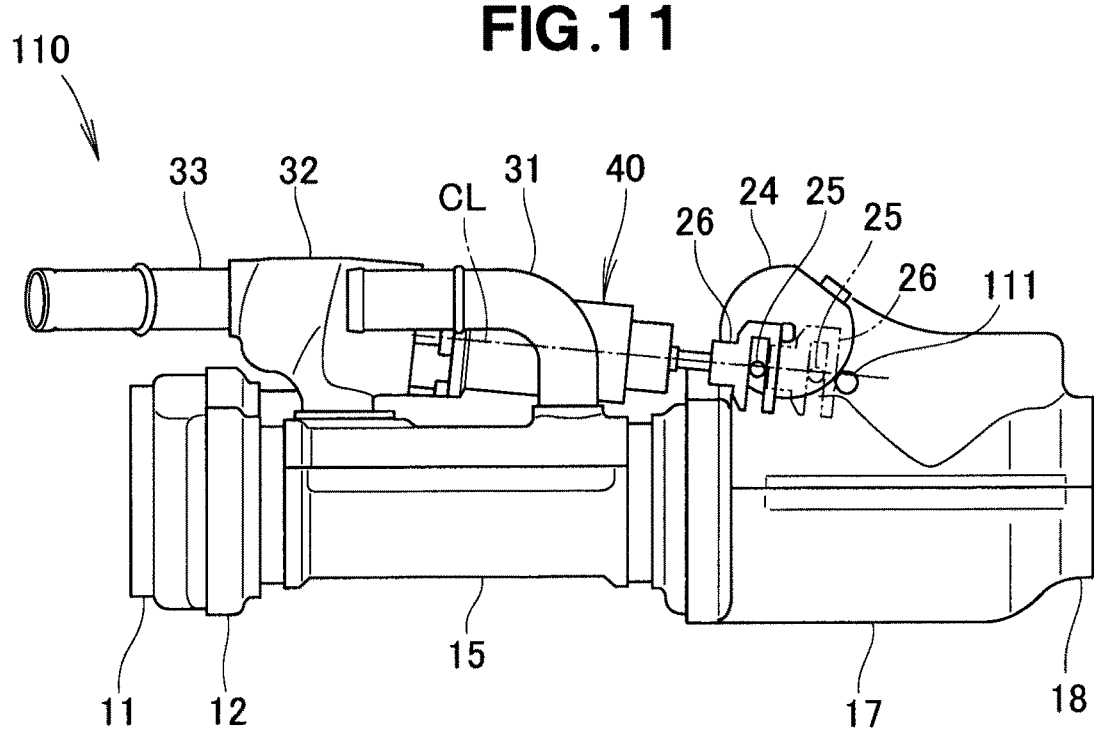
FIG. 11 is a cross-sectional view of a heat exchange device in a sixth embodiment of the present invention.

Next, a discussion is made as to a waste heat recovery device providing a heat exchange device with reference to FIG. 11. FIG. 11 shows a cross-section of the waste heat recovery device in the sixth embodiment. It is noted that elements common to those in FIG. 1 are designated by the same reference numerals and their detailed discussions are omitted.

As shown in FIG. 11, a waste heat recovery device 110 includes a second pin (stopper) 111 extending from a lateral side of the valve chamber 17 onto the center axis CL of the rod 70.

Advancement of the rod 70 is prevented by abutment of the hook portion 26 on the second pin 111. The waste heat recovery device 110 produces predetermined advantageous results of the present invention.

In particular, since the second pin 111 is disposed on the center axis CL of the rod 70, it is possible to limit advancement of the rod 70 without producing a bending moment on the rod 70.

<Seventh Embodiment>

Figure 12:
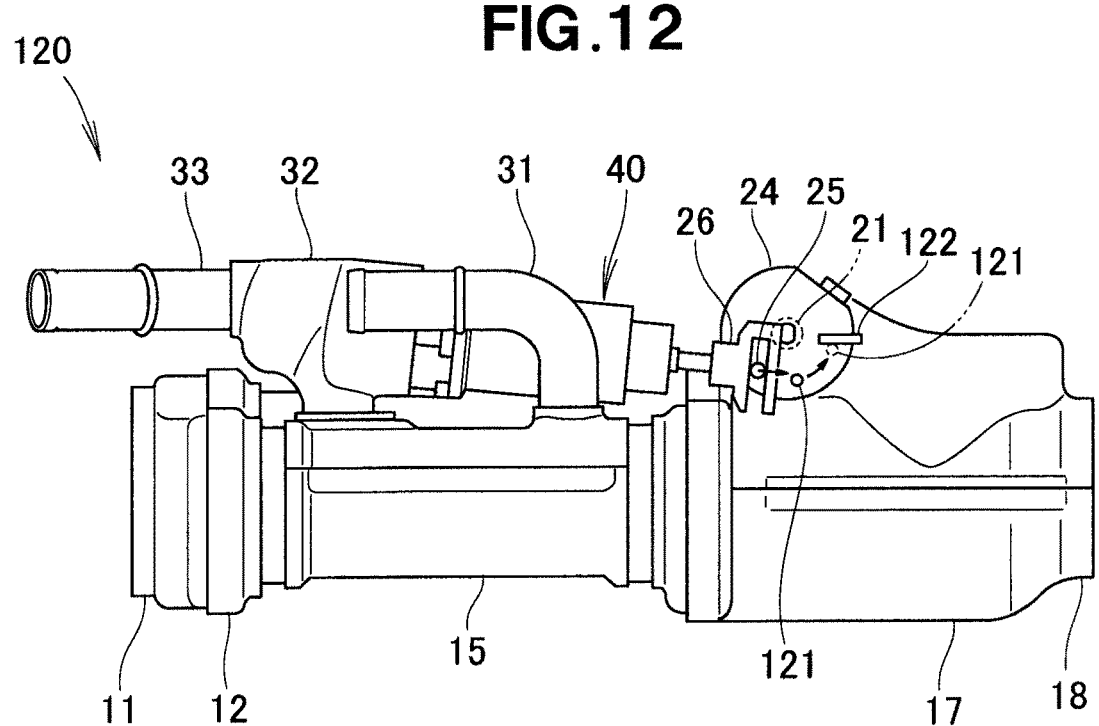
FIG. 12 is a cross-sectional view of a heat exchange device in a seventh embodiment of the present invention.

Next, a discussion is made as to a waste heat recovery device providing a heat exchange device with reference to FIG. 12. FIG. 12 shows a cross-section of the waste heat recovery device in the seventh embodiment in correspondence to FIG. 11. It is noted that elements common to those in FIG. 11 are designated by the same reference numerals and their detailed discussions are omitted.

As shown in FIG. 12, a waste heat recovery device 120 includes a third pin (abutment piece) 121 rising from the plate 24. The waste heat recovery device 120 further includes a bar (stopper) 122 extending from the lateral side of the valve chamber 17 onto an orbit of the third pin 121.

Advancement of the rod 70 rotates the plate 24. The third pin 121 revolves concurrently with the rotation of the plate 24. When the rod 70 advances a predetermined amount to thereby revolve the third pin 121 by a predetermined amount, the third pin 121 abuts on the bar 122. The abutment of the third pin 121 on the bar 122 prevents further revolution of the third pin 121 as well as further advancement of the rod 70. The waste heat recovery device 120 produces the predetermined advantageous results of the present invention.

<Eighth Embodiment>

Figure 13:
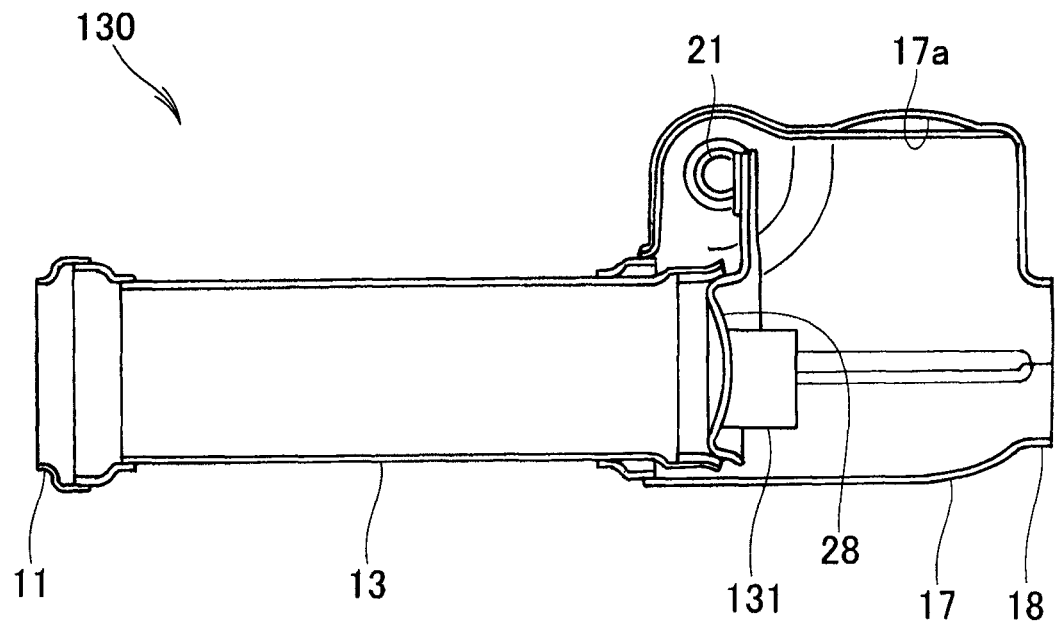
FIG. 13 is a cross-sectional view of a heat exchange device in an eighth embodiment of the present invention.

Next, a discussion is made as to a waste heat recovery device providing a heat exchange device with reference to FIG. 13. FIG. 13 shows a cross-section of the waste heat recovery device in the eighth embodiment in correspondence to FIG. 4B. It is noted that elements common to those in FIG. 4B are designated by the same reference numerals and their detailed discussions are omitted.

As shown in FIG. 13, a waste heat recovery device 130 includes a stopper 131 attached to the valve 28. The stopper 131 abuts on an inner wall 17a of the valve chamber 17 by the valve 28 swinging a predetermined amount. The abutment of the stopper 131 on the inner wall 17a prevents further swinging of the valve 28. The waste heat recovery device 130 produces the predetermined advantageous results of the present invention.

<Ninth Embodiment>

Figure 14:
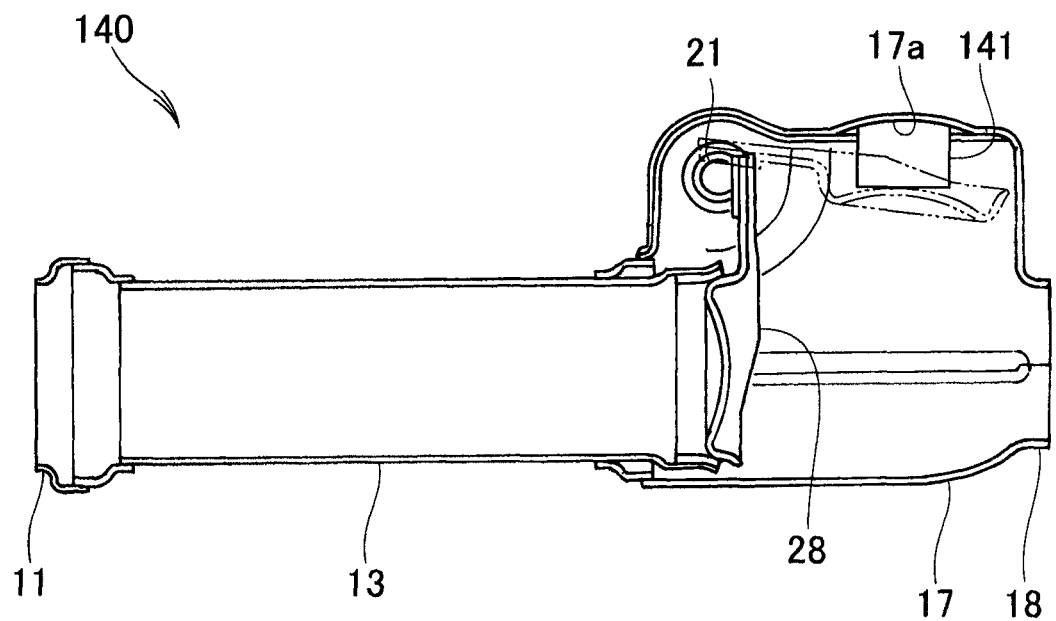
FIG. 14 is a cross-sectional view of a thermoactuator mounted on a heat exchange device in a ninth embodiment of the present invention.

Next, a discussion is made as to a waste heat recovery device providing a heat exchange device with reference to FIG. 14. FIG. 14 shows a cross-section of the waste heat recovery device in the ninth embodiment in correspondence to FIG. 13. It is noted that elements common to those in FIG. 13 are designated by the same reference numerals and their detailed discussions are omitted.

As shown in FIG. 14, a waste heat recovery device 140 includes a stopper 141 disposed on the inner wall 17a of the valve chamber 17 as well as on an orbit of the valve 28. By swinging a predetermined amount, the valve 28 abuts on the stopper 141. By abutting on the stopper 141, the valve 28 is prevented from further swinging. The waste heat recovery device 140 produces the predetermined advantageous results of the present invention.

<Tenth Embodiment>

Next, the tenth embodiment is discussed with reference to FIGS. 15A and 15B.

Figure 15A:
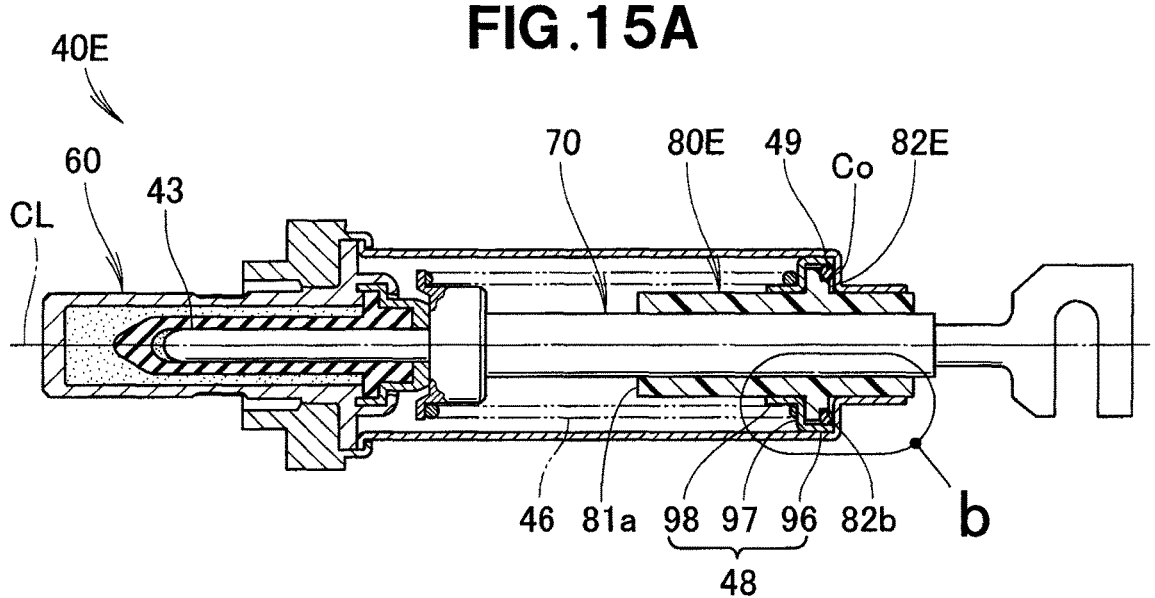
FIGS. 15A and 15B are cross-sectional views of a thermoactuator mounted on a heat exchange device in a tenth embodiment of the present invention.

FIG. 15A shows a cross-section of a thermoactuator used in a heat waste recovery device in the tenth embodiment in correspondence to FIG. 2. It is noted that elements common to those in FIG. 2 are designated by the same reference numerals and their detailed discussions are omitted.

As shown in FIG. 15A, a thermoactuator 40E differs from the thermoactuator shown in FIG. 2 in that the stopper portion has a distal end of modified shape.

Figure 15B:
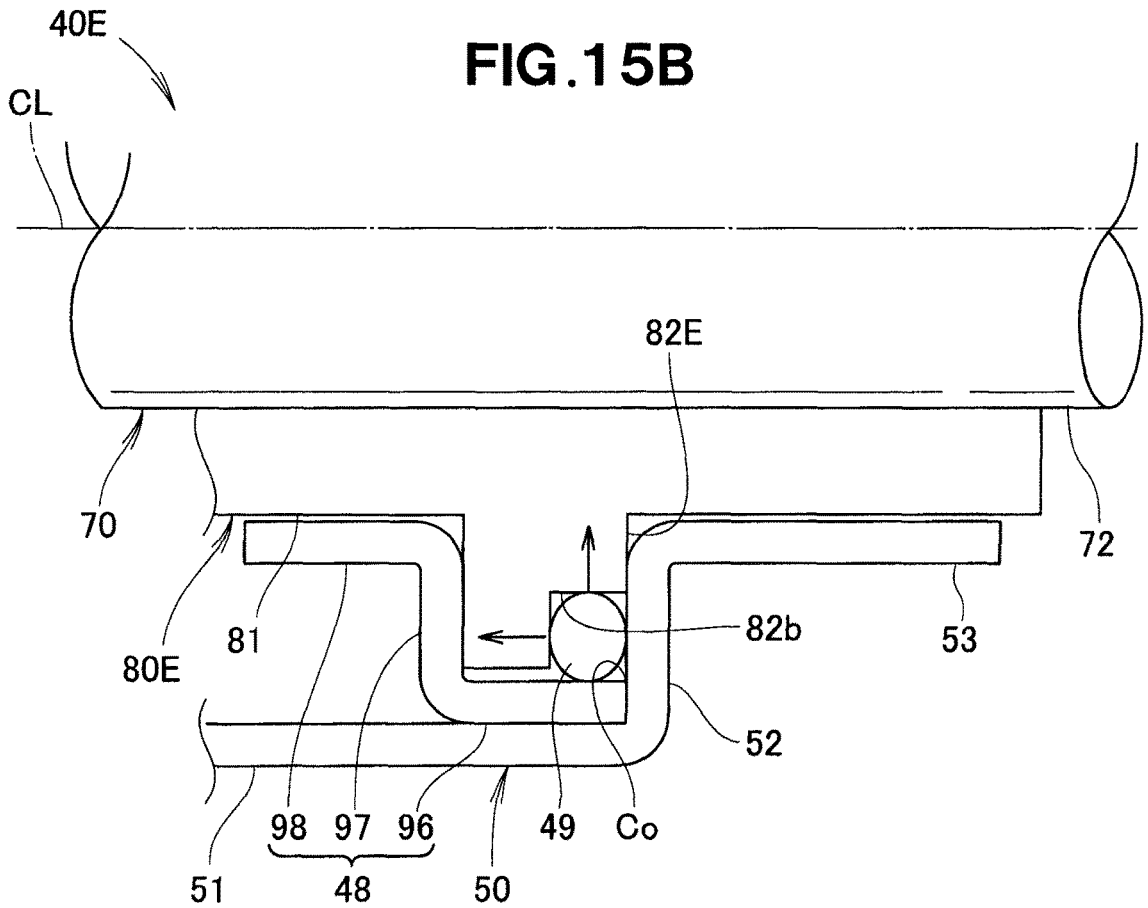

As shown in FIG. 15B, a stopper portion 82E of the thermoactuator 40E has an L-shaped groove 82b of generally L-shaped cross-section formed at an end portion of an outer circumference thereof. The L-shaped groove 82b is located in an opposed relationship with a generally L-shaped cross-sectional corner portion Co defined by the case contact portion 96 and the case stepped portion 52. The corner portion Co and the L-shaped groove 82b define a space of generally rectangular cross-section. The O-ring 49 is disposed in contact with all of sides of the generally rectangular cross-section.

Although the corner portion Co is defined by the two members, i.e., the guide member 48 and the case 50, the corner portion Co may be defined only by either the guide member 48 or the case 50.

That is, the L-shaped groove 82b of generally L-shaped cross-section is formed at the end of the outer circumference of the stopper portion 82E, the corner portion Co of generally L-shaped cross-section defined by the case 50 or the guide member 48 is located in an opposed relationship with the L-shaped groove 82b, and the O-ring 49 (rubber-made member 49) is disposed in contact with respective sides of a space of generally rectangular cross-section defined by the L-shaped groove 82b and the corner portion Co.

Thus, the O-ring 49 can urge a bearing 80E both in a direction toward the center axis CL of the rod 70 and in a direction along the center axis CL of the rod 70. Such an arrangement produces the predetermined advantageous results of the present invention.

Further, the work of assembling the thermoactuator 40E is facilitated because the work can be done with the O-ring 49 fitting in the L-shaped groove 82b.

<Eleventh Embodiment>

Next, the eleventh embodiment is discussed with reference to FIG. 16.

Figure 16:
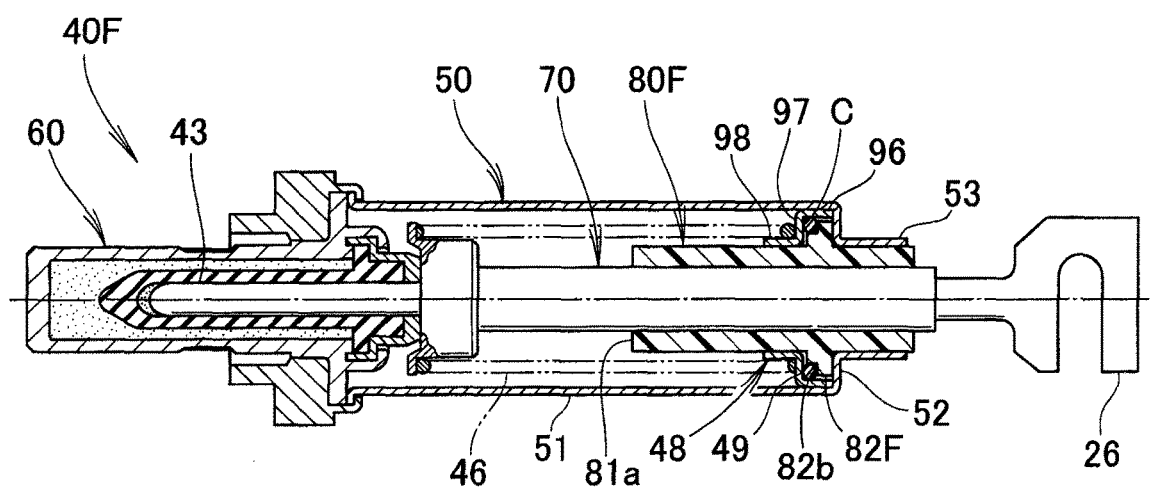
FIG. 16 is a cross-sectional view of a thermoactuator mounted on a heat exchange device in an eleventh embodiment of the present invention.

FIG. 16 shows a cross-section of a thermoactuator used in a heat waste recovery device in the eleventh embodiment in correspondence to FIG. 15A. It is noted that elements common to those in FIG. 15A are designated by the same reference numerals and their detailed discussions are omitted.

As shown in FIG. 16, a thermoactuator 40F differs from the thermoactuator shown in FIG. 15A in that the stopper portion has a distal end of modified shape.

That is, a stopper portion 82F of the thermoactuator 40F has the L-shaped groove 82b of generally L-shaped cross-section formed at a rear end portion of an outer circumference thereof. The thermoactuator 40F employing a bearing 80F having such a stopper portion 82F produces the predetermined advantageous results of the present invention.

<Twelfth Embodiment>

Next, the twelfth embodiment is discussed with reference to FIG. 17. FIG. 17 shows a cross-section of a thermoactuator used in a heat waste recovery device in the twelfth embodiment in correspondence to FIG. 15A. It is noted that elements common to those in FIG. 15A are designated by the same reference numerals and their detailed discussions are omitted.

As shown in FIG. 17, a thermoactuator 40G differs from the thermoactuator shown in FIG. 15A in that modifications are made to the shapes of the bearing, the guide member and the case.

A bearing 80G includes a tubular portion 81G and tapering portions 81b, 81b formed at front and rear ends of the tubular portion 81G. A guide member 48G includes a guide portion 98G and a bend portion 99G folded over from a rear end of the guide portion 98G toward the center axis CL of the rod 70. A case 50G has a bend portion 56G folded over from a distal end of the reduced diameter portion 53 toward the center axis CL of the rod 70.

In the thermoactuator 40G, the O-rings 49 are disposed in contact with the respective front and rear tapering portions 81b, 81b. The thermoactuator 40G produces the predetermined advantageous results of the present invention.

In the thermoactuator 40G shown in FIG. 17, the O-ring 49 on a right side of FIG. 17 is disposed between the bearing 80 and the case 50G. That is, the thermoactuator 40G includes the tubular case 50G, and the temperature sensitive portion 60 attached to one end of the case 50G for sensing a temperature of the outside. The thermoactuator 40G also includes the piston 43 received in the case 50G for advancing depending on the temperature sensed by the temperature sensitive portion 60, and the rod 70 disposed on the distal end of the piston 43 for advancing by advancement of the piston 43. The thermoactuator 40G further includes the return spring 46 accommodated in the case 50G for urging the rod 70 in the direction to retreat the rod 70. The thermoactuator 40G further includes the bearing 80G extending from the opposite end of the case 50G toward the one end of the case 50G along an outer circumferential surface of the rod 70. The thermoactuator 40G further includes the guide member 48G disposed on the outer circumference of the bearing 80G and receiving the return spring 46 for limiting circumferential displacement of the spring 46. A resin is used as material for the bearing 80G. A metal is used as material for the case 50G. The O-ring 49 (ring-shaped rubber member) is disposed between the bearing 80G and the case 50G for exerting an urging force on the bearing 80G to limit displacement of the bearing 80G.

<Thirteenth Embodiment>

Next, the thirteenth embodiment is discussed with reference to FIG. 18. FIG. 18 shows a cross-section of a thermoactuator used in a heat waste recovery device in the thirteenth embodiment in correspondence to FIG. 15A. It is noted that elements common to those in FIG. 15A are designated by the same reference numerals and their detailed discussions are omitted.

As shown in FIG. 18, a thermoactuator 40H differs from the thermoactuator shown in FIG. 15A in that modifications are made to the shapes of the bearing, the guide member and the case.

More specifically, a bearing 80H has no tapering portion. A guide member 48 and a case 50H have respective tapering portions 48a, 50a formed thereon. The O-rings 49, 49 are disposed in contact with these tapering portions 48a, 50a. The O-rings 49, 49 are also disposed at boundaries between a tubular portion 81H of the bearing 80H and a stopper portion 82H of the bearing 80H. The thermoactuator 4011 produces the predetermined advantageous results of the present invention.

<Fourteenth Embodiment>

Next, the fourteenth embodiment is discussed with reference to FIG. 19. FIG. 19 shows a cross-section of a thermoactuator used in a heat waste recovery device in the fourteenth embodiment in correspondence to FIG. 15A. It is noted that elements common to those in FIG. 15A are designated by the same reference numerals and their detailed discussions are omitted.

As shown in FIG. 19, a thermoactuator 40J differs from the thermoactuator shown in FIG. 15A in that modifications are made to the shape of the bearing and the rubber member.

More specifically, a bearing 80J includes a tubular portion 81J and a triangular cross-sectional edge portion 81c formed integrally with the tubular portion 81J along an outer circumference of the tubular portion 81J. A rubber member 49J of quadrangular cross-section is mounted on the tubular portion 81J and covers the edge portion 81c. The thermoactuator 40H produces the predetermined advantageous results of the present invention.

It is understood that the present invention is not limited to the respective embodiments. That is, the arrangements or structures shown in the respective embodiments may be appropriately combined as long as the combined arrangements or structures have functions and advantageous results of the present invention. For example, the escape portion may be provided in the embodiment wherein the end of the guide member provides the stopper. Other examples of combinations are possible without being limited to such an example.

Obviously, various minor changes and modifications of the present invention are possible in the light of the above teaching. It is therefore to be understood that within the scope of the appended claims the invention may be practiced otherwise than as specifically described.

What is claimed is:

1. A heat exchange device comprising:
   a branching portion for introducing an exhaust gas and dividing the introduced exhaust gas to flow to two fluid passageways;
   a first fluid passageway extending from the branching portion;
   a second fluid passageway extending from the branching portion along the first fluid passageway;
   a heat exchanger attached to the second fluid passageway for recovery of energy from heat of the exhaust gas;
   a thermoactuator comprising a tubular case, a temperature sensitive portion attached to one end of the case for sensing a temperature of a medium flowing around the temperature sensitive portion, a piston received in a sleeve in the temperature sensitive portion for advancing by the temperature sensed by the temperature sensitive portion, a rod disposed on a distal end of the piston for advancing by the advancement of the piston, and a return spring accommodated in the case and urging the rod in a direction to retreat the rod;
   a valve actuated by the thermoactuator for opening and closing the first fluid passageway or the second fluid passageway; and
   a stopper provided in the case at a position to abut the rod and thereby limit advancement of the rod to limit an opening degree of the valve.

2. The heat exchange device of claim 1, wherein the rod comprises a rod base portion abutting on the distal end of the piston, and a rod body portion formed integrally with the rod base portion,
   wherein the rod base portion has a diameter larger than a diameter of the rod body portion such that the rod base portion has a stepped portion extending toward the rod body portion,
   wherein the heat exchange device further comprises a bearing disposed along an outer circumferential surface of the rod body portion, the bearing and the stepped portion circumferentially overlapping, and
   wherein the stopper is formed by an end of the bearing.

3. The heat exchange device of claim 1, wherein the rod has a rod flange portion projecting from a lateral surface thereof to an outer circumference of the return spring,
   wherein the case has a projecting portion projecting from an inner circumferential surface thereof toward a center axis of the case,
   wherein the projecting portion projects to a location circumferentially overlapping the rod flange portion, and
   wherein the stopper is formed by the projecting portion.

4. The heat exchange device of claim 1, wherein the rod comprises a rod base portion abutting on the distal end of the piston, and a rod body portion formed integrally with the rod base portion,
   wherein the rod base portion has a diameter larger than a diameter of the rod body portion such that the rod base portion has a stepped portion extending toward the rod body portion,
   wherein the heat exchange device further comprises a guide member extends from an opposite end of the case toward the one end of the case along an inner circumference of the return spring for limiting circumference displacement of the return spring,
   wherein the guide member and the stepped portion circumferentially overlap, and
   wherein the stopper is formed by an end of the guide member.

5. The heat exchange device of claim 1, wherein the case has an opposite end defining a bend portion folded over to a location circumferentially overlapping the rod, and wherein the stopper is formed by the bend portion.

6. The heat exchange device of claim 1, wherein the thermoactuator further comprises a bearing extending from an opposite end of the case toward the one end of the case along an outer circumferential surface of the rod, and a guide member disposed along an outer circumference of the bearing and receives the return spring for limiting circumferential displacement of the return spring,
   wherein the bearing is made of a resin material,
   wherein the case is made of a metal material,
   wherein the guide member comprises a case contact portion contacting an inner circumferential surface of the case, a receiving portion extending from the case contact portion toward a center axis of the rod and receiving the return spring, and a guide portion extending from a distal end of the receiving portion toward the temperature sensitive portion for limiting circumferential displacement of the return spring, and wherein the heat exchange device further comprises a ring-shaped rubber member disposed between the bearing and the guide member and having an urging force to limit displacement of the bearing.

7. The heat exchange device of claim 6, wherein one of the bearing and the guide member has a tapering portion slanting relative to a center axis of the case, and wherein the tapering portion and the rubber member are in contact with each other.

8. The heat exchange device of claim 7, wherein the rubber member is an O-ring.

9. The heat exchange device of claim 6, wherein the rubber member is an O-ring.

10. The heat exchange device of claim 1, wherein the thermoactuator further comprises a bearing extending from an opposite end of the case toward the one end of the case along an outer circumferential surface of the rod, wherein the bearing is made of a resin material, wherein the case is made of a metal material, and wherein the heat exchange device further comprises a ring-shaped rubber member disposed between the bearing and the case and having an urging force to limit displacement of the bearing.

11. The heat exchange device of claim 10, wherein one of the bearing and the case has a tapering portion slanting relative to a center axis of the case, and wherein the tapering portion and the rubber member are in contact with each other.

12. The heat exchange device of claim 11, wherein the rubber member is an O-ring.

13. The heat exchange device of claim 10, wherein the rubber member is an O-ring.

* * * * *